United States Patent
Nakao

(10) Patent No.: US 9,826,478 B2
(45) Date of Patent: Nov. 21, 2017

(54) INFORMATION PROCESSING APPARATUS, NON-TRANSITORY COMPUTER READABLE RECORDING MEDIUM, AND INFORMATION PROCESSING METHOD

(71) Applicant: FUJITSU LIMITED, Kawasaki-shi, Kanagawa (JP)

(72) Inventor: Manabu Nakao, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 61 days.

(21) Appl. No.: 14/732,819

(22) Filed: Jun. 8, 2015

(65) Prior Publication Data

US 2016/0044628 A1 Feb. 11, 2016

(30) Foreign Application Priority Data

Aug. 11, 2014 (JP) ................. 2014-163524

(51) Int. Cl.
  *H04W 24/00* (2009.01)
  *H04W 52/02* (2009.01)
  *H04W 4/02* (2009.01)
  *H04W 64/00* (2009.01)
  *G01S 5/02* (2010.01)
  *H04W 84/12* (2009.01)

(52) U.S. Cl.
  CPC ....... *H04W 52/0209* (2013.01); *G01S 5/0252* (2013.01); *H04W 4/023* (2013.01); *H04W 64/00* (2013.01); *H04W 84/12* (2013.01); *Y02B 60/50* (2013.01)

(58) Field of Classification Search
  CPC . H04W 52/0209; H04W 64/00; H04W 4/023; H04W 84/12; G01S 5/0252

USPC ............................. 455/456.1–457
See application file for complete search history.

(56) References Cited

U.S. PATENT DOCUMENTS

| | | | | |
|---|---|---|---|---|
| 2010/0150073 A1* | 6/2010 | Sasao | .................... | G01S 5/0252 370/328 |
| 2010/0317390 A1* | 12/2010 | Rekimoto | ............. | H04W 64/00 455/511 |
| 2011/0176455 A1* | 7/2011 | Matsunada | ........... | G01S 5/0072 370/254 |

FOREIGN PATENT DOCUMENTS

| JP | 2005-130069 | 5/2005 |
|---|---|---|
| JP | 2007-132884 | 5/2007 |
| JP | 2008-131190 | 6/2008 |
| JP | 2009-188922 | 8/2009 |
| JP | 2010-141829 | 6/2010 |

* cited by examiner

*Primary Examiner* — Marcus Hammonds
(74) *Attorney, Agent, or Firm* — Fujitsu Patent Center

(57) ABSTRACT

An information processing apparatus includes a reception unit, a first storage unit, a first processor, a second storage unit, a third storage unit, and a second processor. The second processor executes a process of specifying a place by place specifying data of a partial area stored in the second storage unit based on a signal received by the reception unit, and a process of updating the place specifying data of the partial area stored in the second storage unit and an identification information of an access point stored in the third storage unit through the first processor when the identification information of the access point detected from the signal received by the reception unit is stored in the third storage unit.

6 Claims, 18 Drawing Sheets

FIG. 1D

| PLACE L1 | | | | | | | | | | | | |
|---|---|---|---|---|---|---|---|---|---|---|---|---|
| | 12:34:56:78:90:AB (=a₁) | | | | 12:34:56:78:90:AC (=a₂) | | | | 12:34:56:78:90:AD (=a₃) | | | |
| RSSI | MORE THAN -40 | -40~ -60 | -60~ -80 | NOT DETECTED | MORE THAN -40 | -40~ -60 | -60~ -80 | NOT DETECTED | MORE THAN -40 | -40~ -60 | -60~ -80 | NOT DETECTED |
| LIKELIHOOD | 0.6 | 0.25 | 0.1 | 0.05 | 0.0 | 0.0 | 0.1 | 0.9 | 0.05 | 0.05 | 0.05 | 0.05 |

| PLACE L2 | | | | | | | | | | | | |
|---|---|---|---|---|---|---|---|---|---|---|---|---|
| | 12:34:56:78:90:AB (=a₁) | | | | 12:34:56:78:90:AC (=a₂) | | | | 12:34:56:78:90:AD (=a₃) | | | |
| RSSI | MORE THAN -40 | -40~ -60 | -60~ -80 | NOT DETECTED | MORE THAN -40 | -40~ -60 | -60~ -80 | NOT DETECTED | MORE THAN -40 | -40~ -60 | -60~ -80 | NOT DETECTED |
| LIKELIHOOD | 0.2 | 0.6 | 0.1 | 0.1 | 0.05 | 0.1 | 0.75 | 0.1 | 0.8 | 0.1 | 0.05 | 0.05 |

※ THIS EXAMPLE IS EXAMPLE IN WHICH THE NUMBER OF BINS (THE NUMBER OF SECTIONS) OF HISTOGRAM IS 4.

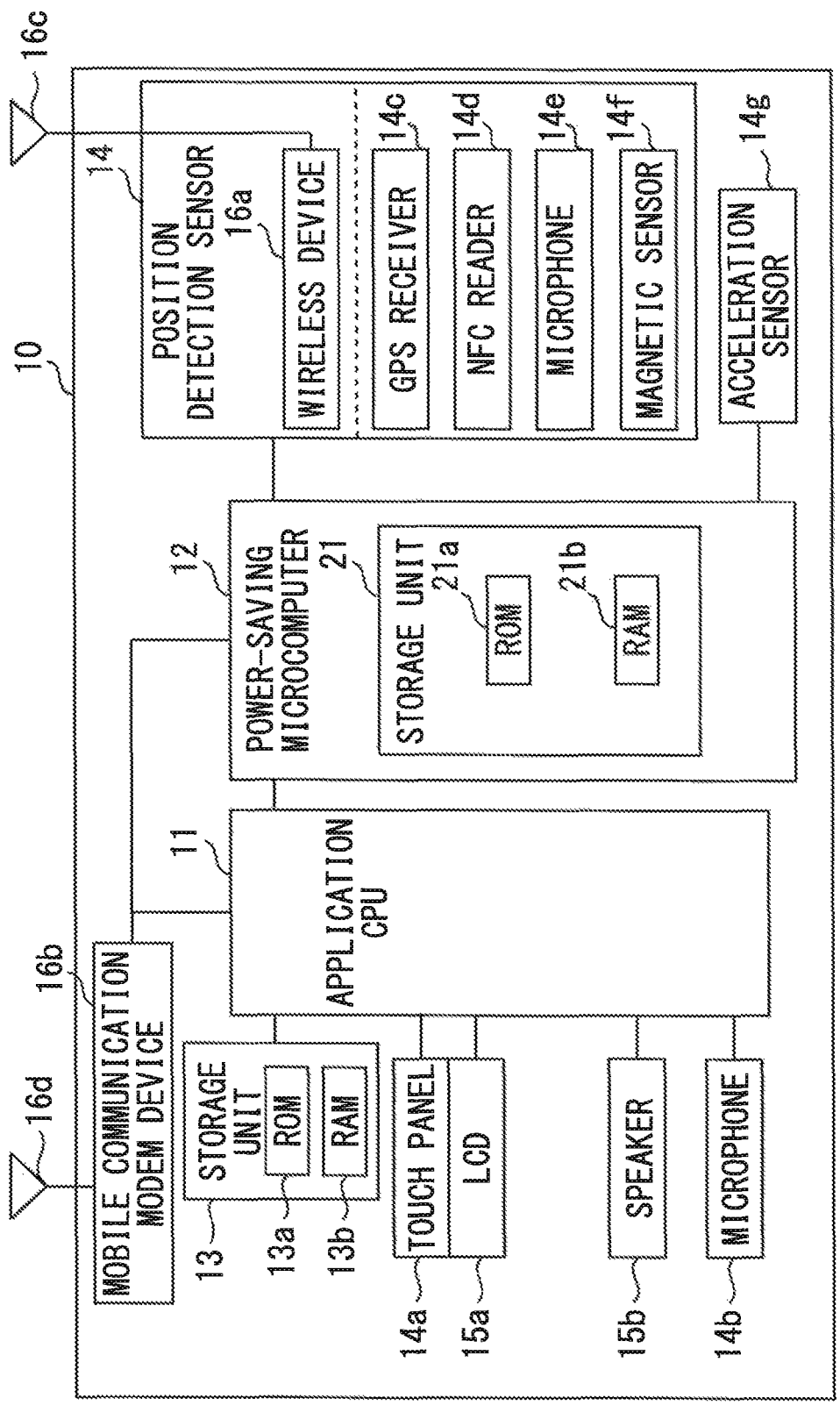

SCAN DATA ACQUIRED FROM Wifi DEVICE
(ADDRESS INFORMATION OF EACH AP AND RSSI)

| ADDRESS | RADIO FIELD STRENGTH |
|---|---|
| 12:34:56:78:90:AB | −50 |
| 12:34:56:78:90:AC | −30 |
| 12:34:56:78:90:AD | −70 |

(2)

ADDRESS INFORMATION LIST

| ADDRESS |
|---|
| 12:34:56:78:90:AB |
| 12:34:56:78:90:AC |
| 12:34:56:78:90:AD |

FIG. 6B

| | 12:34:56:78:90:AB (=a₁) | | | 12:34:56:78:90:AC (=a₂) | | | 12:34:56:78:90:AD (=a₃) | | |
|---|---|---|---|---|---|---|---|---|---|
| | RSSI | | | RSSI | | | RSSI | | |
| | MORE THAN -40 | -40~-60 | -60~-80 | NOT DETECTED | MORE THAN -40 | -40~-60 | -60~-80 | NOT DETECTED | MORE THAN -40 | -40~-60 | -60~-80 | NOT DETECTED |
| PLACE L1 LIKELIHOOD | 0.6 | 0.25 | 0.1 | 0.05 | 0.0 | 0.0 | 0.1 | 0.9 | 0.05 | 0.05 | 0.05 | 0.05 |
| PLACE L2 LIKELIHOOD | 0.2 | 0.6 | 0.1 | 0.1 | 0.05 | 0.1 | 0.75 | 0.1 | 0.8 | 0.1 | 0.05 | 0.05 |

EXAMPLE OF HISTOGRAM DATA

| ADDRESS | RSSI |
|---|---|
| 12:34:56:78:90:AB (=a1) | −30 |
| 12:34:56:78:90:AD (=a3) | −70 |

*SCAN DATA IN CALCULATION EXAMPLE 2

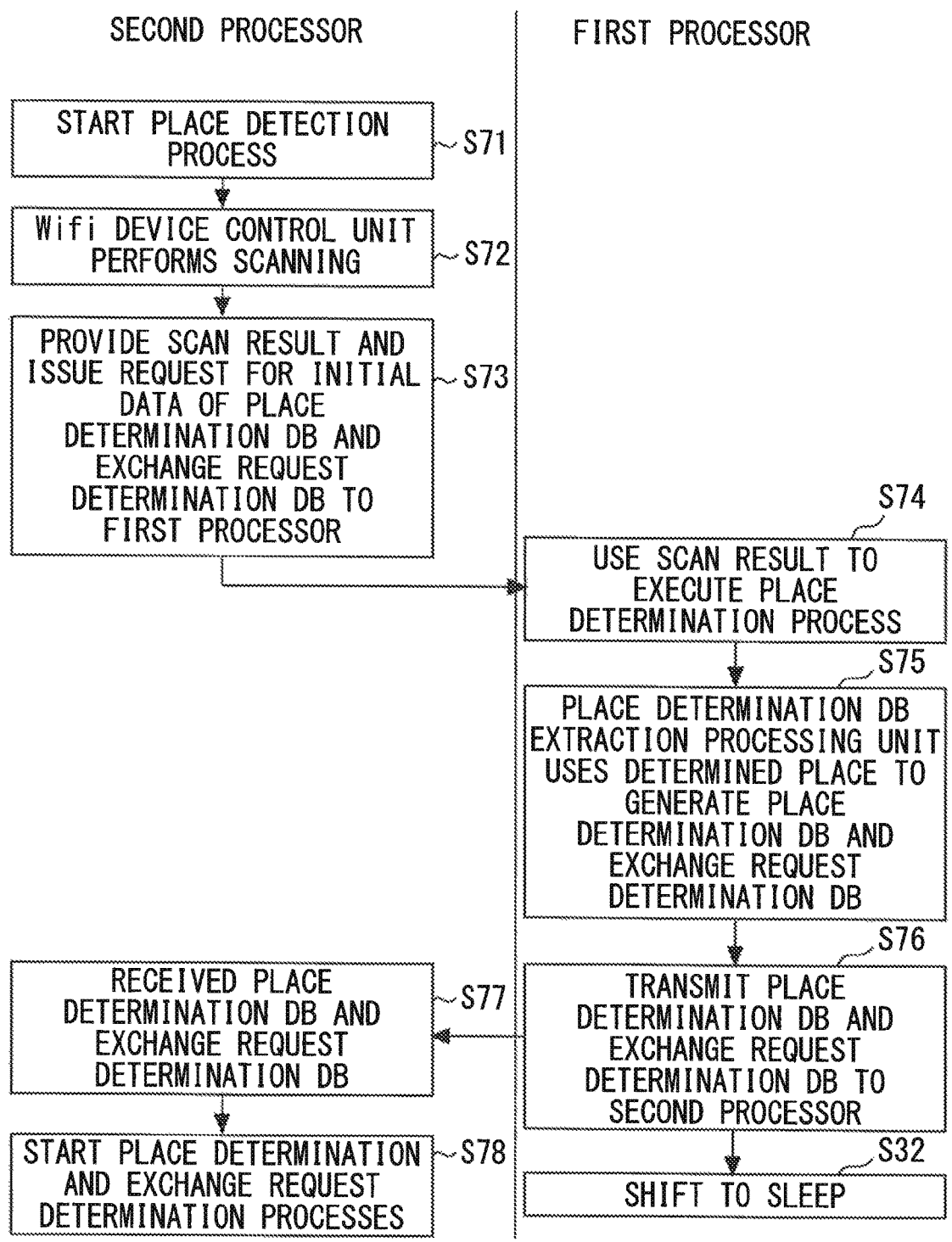

INFORMATION PROCESSING APPARATUS, NON-TRANSITORY COMPUTER READABLE RECORDING MEDIUM, AND INFORMATION PROCESSING METHOD

CROSS-REFERENCE TO RELATED APPLICATION

This application is based upon and claims the benefit of priority of the prior Japanese Patent Application No. 2014-163524, filed on Aug. 11, 2014, the entire contents of which are incorporated herein by reference.

FIELD

The disclosures made herein relate to an information processing apparatus, a non-transitory computer readable recording medium, and an information processing method.

BACKGROUND

In recent years, more places provide access points (APs) for connection to a network using a wireless LAN (Local Area Network), such as a public wireless LAN, along with the spread of ICT (Information and Communication Technology). The access points (hereinafter, also called "APs") are installed in, for example, various stores such as restaurants, commercial facilities such as department stores, public transportations such as station premises and airport facilities, public facilities such as schools, and lodging facilities. The places provided with the access points for connection to the public wireless LAN are also called, for example, wireless LAN spots, Wi-Fi (Wireless Fidelity) spots, free spots, and hot spots.

In a predetermined area of the wireless LAN spot or the like, an information processing apparatus or the like including an interface for connection to the wireless LAN can receive services according to the place that is the location of the information processing apparatus or the like. The "place" refers herein to, for example, a connection available area of the AP, indicating the location of the information processing apparatus or the like in a space where the radio wave transmitted by a wireless LAN in a room, a store, or the like provided with the AP reaches. Examples of the information processing apparatus or the like provided with the interface for connection to the wireless LAN include a smartphone, a notebook PC (PC: Personal Computer), a tablet PC, a PDA (Personal Digital Assistant), and a game machine.

Examples of a service format according to the place that is the location of the information processing apparatus or the like in the predetermined area of the wireless LAN spot or the like include automatically notifying a person (referred to as "user") using the information processing apparatus or the like of coupons usable in a store, such as a restaurant, that provides the AP.

For example, it is assumed that the information processing apparatus or the like is provided with an application (application software) of coupons usable in a store or the like, the application downloaded in advance from a site or the like on the Internet operated by the store or the like. The application provided to the information processing apparatus or the like determines the place that is the location of the information processing apparatus according to, for example, detection of the AP installed in the store or the like. If the application provided to the information processing apparatus or the like determines that the determined location is a predetermined place, the application automatically executes, for example, a coupon application and displays coupons usable in the store on a display screen of the information processing apparatus to notify the user of the coupons. The usable coupons are automatically displayed on the display screen of the information processing apparatus or the like in the predetermined place in the store providing the AP, and this can save the user of the information processing apparatus or the like the time and labor of, for example, starting the provided application of coupons. A service with improved convenience and associated with the place that is the location of the information processing apparatus or the like can be provided to the user of the information processing apparatus or the like in a connection area of the AP installed in the store or the like.

Related art literatures describing techniques related to the technique described in the present specification include the following Patent Documents.

[Patent Document 1] Japanese Patent Laid-Open Publication No. JP 2005-130069

[Patent Document 2] Japanese Patent Laid-Open Publication No. JP 2009-188922

SUMMARY

The information processing apparatus or the like always executes a place detection process for estimating the place that is the location in order to receive a service associated with the place in the predetermined area such as a wireless LAN spot. The place detection process is executed based on, for example, received signal strength (RSSI: Received Signal Strength Indication/Received Signal Strength Indicator) of a radio wave (beacon signal) transmitted by the AP, identification information of each AP, and the like. Examples of the identification information of each AP include an SSID (Service Set Identifier) and a MAC (Media Access Control) address (BSSID: Basic Service Set Identifier).

In the place detection process, the information processing apparatus or the like estimates the "place" of the location by, for example, collating the detected identification information of each AP and the RSSI of each AP with the identification information, the RSSI, and the like of each AP associated with the "place" and stored in a database or the like. For example, the information processing apparatus or the like always scans radio waves (beacon signals) transmitted from each AP at certain periodic intervals to acquire the identification information of each AP and the RSSI of each AP according to the location. The information processing apparatus or the like executes the place detection process based on the identification information of each AP, the RSSI of each AP, and the like obtained from the result of the scan.

Meanwhile, in the information processing apparatus or the like, the power consumption of a wireless LAN device, which is the interface for connection to the wireless LAN, and a CPU (Central Processing Unit) tends to be relatively high. When a service associated with the place in the predetermined area of the wireless LAN spot or the like is received, the operation ratios of the wireless LAN device and the CPU are increased by the scan of the beacon signals and the place detection process that are always executed. Therefore, the power of a battery or the like is quickly consumed in the information processing apparatus or the like, and for example, the operating time of the information processing apparatus or the like in the wireless LAN spot or the like is limited.

To reduce the power consumption regarding the place detection process, the information processing apparatus or the like can include, for example, a low-power-consumption microcomputer that executes the place detection process, aside from the CPU that executes the application. The CPU that executes the application is set in a sleep state in a period of the place detection process, and is activated to execute an application process when the low-power-consumption microcomputer detects a specific place, for example. In this way, a reduction in the total power consumption of the information processing apparatus or the like can be expected.

However, the storage capacity for storing place determination information for determining the place of the location is limited in the low-power-consumption microcomputer, and the area range of the place held in a database is limited. Although the amount of data of the place determination information can be reduced to expand the area range of the place held in the database, the detection accuracy of the place detection process disadvantageously deteriorates.

The technique can be illustrated by the following configuration of an information processing apparatus. That is, the information processing apparatus includes a reception unit that receives a signal from an access point; a first storage unit that stores master data of place specifying data including identification information of the access point detected from the signal received by the reception unit in each place and including strength of the received signal; a first processor that accesses the first storage unit; a second storage unit that stores place specifying data of a partial area extracted by the first processor from the place specifying data in the first storage unit; a third storage unit that stores the identification information of the access point detected in a place around a place specified by the place specifying data of the extracted partial area; and a second processor that accesses the second storage unit and the third storage unit. The second processor executes a process of specifying the place by the place specifying data of the partial area stored in the second storage unit based on the signal received by the reception unit, and a process of updating the place specifying data of the partial area stored in the second storage unit and the identification information of the access point stored in the third storage unit through the first processor when the identification information of the access point detected from the signal received by the reception unit is stored in the third storage unit.

Objects and advantages of the disclosures will be realized and attained by means of the elements and combinations particularly pointed out in the claims.

BRIEF DESCRIPTION OF THE DRAWINGS

FIG. 1D depicts an example of place determination information;

FIG. 4 depicts an example of a hardware configuration of an information processing apparatus of the present embodiment;

FIG. 6A depicts an example of scan data and an address information list;

FIG. 6B depicts an example of place determination information;

FIG. 8E is a diagram illustrating a processing sequence regarding the exchange process of the data of each DB between the first processor and the second processor at the start of a place detection process.

DESCRIPTION OF EMBODIMENTS

Hereinafter, an information processing apparatus according to an embodiment will be described with reference to the drawings. The configuration of the following embodiment is illustrative, and the information processing apparatus is not limited to the configuration of the embodiment.

Hereinafter, the information processing apparatus will be described with reference to the drawings of FIGS. 1A to 8E.

COMPARATIVE EXAMPLE 1

Figure 1A:
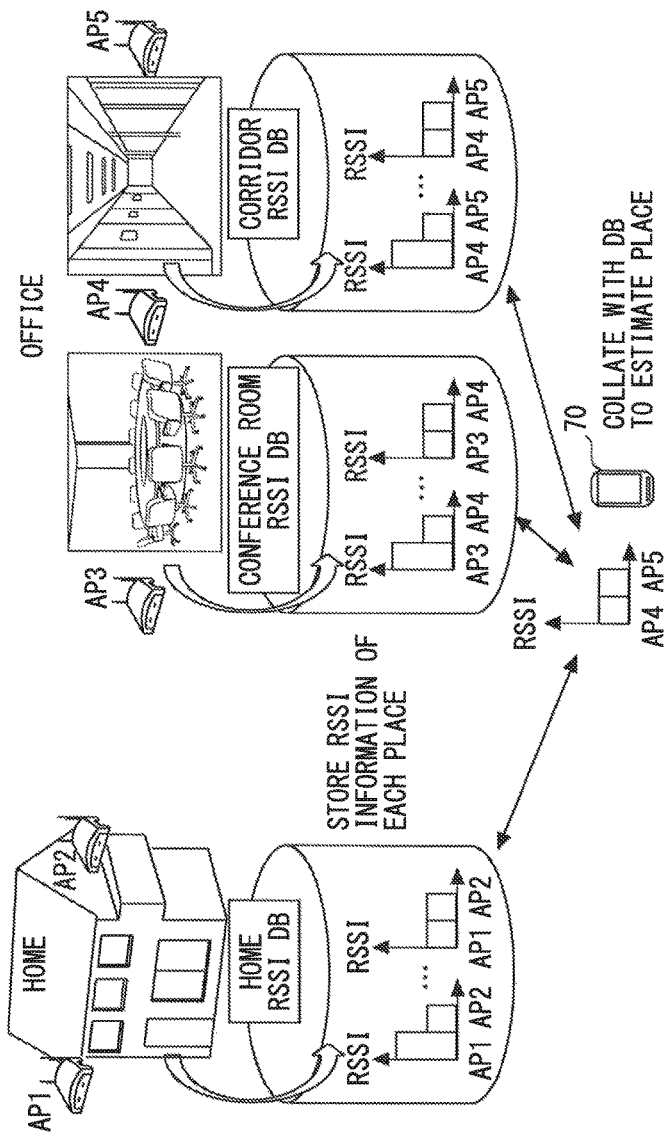
FIG. 1A is an explanatory view explaining a place detection process of Comparative Example 1.
Figure 1B:
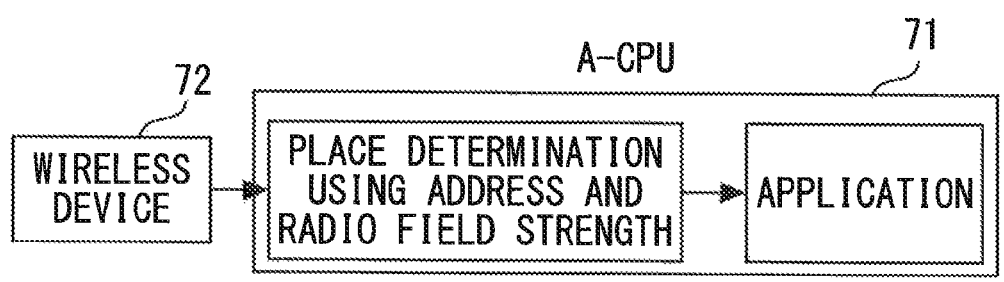
FIG. 1B is an explanatory view of a processing configuration regarding the place detection process of Comparative Example 1.

FIGS. 1A and 1B illustrate explanatory views of a place detection process by an information processing apparatus of Comparative Example 1. FIG. 1A is an explanatory view of a place detection process based on access points (APs) using a wireless LAN (Local Area Network), such as a public wireless LAN, installed at home, at an office of a company, or the like, for example. An example of a communication standard of the wireless LAN includes Wi-Fi (Wireless Fidelity).

In the explanatory view of FIG. 1A, AP1 to AP5 indicate access points (hereinafter, also called "APs") of a wireless LAN, such as a public wireless LAN, and an information processing apparatus 70 is, for example, an information processing apparatus including an interface for connection to the wireless LAN. Examples of the information processing apparatus including the interface for connection to the wireless LAN include a mobile phone, a smartphone, a notebook PC (PC: Personal Computer), a tablet PC, a PDA (Personal Digital Assistant), and a game machine. Although the smartphone serves as a representative example in describing the place detection process in the following description, any information processing apparatus including the interface for connection to the wireless LAN, such as a PC, a car navigation apparatus, a digital audio player, and a digital camera, is possible. In the following description, Wi-Fi serves as a communication standard of the wireless LAN in describing the place detection process.

The radio field strength of the radio wave used in the wireless LAN or the like changes according to, for example, the distance between the information processing apparatus 70 and each AP. Therefore, in the place detection process of the information processing apparatus 70, the place that is the location of the information processing apparatus 70 in the predetermined area can be detected based on, for example, the radio field strength of the radio wave received from each AP. Here, the "place" is, for example, a connection available area of the AP, indicating the location of the information processing apparatus or the like in a space where the radio wave transmitted by a wireless LAN of a room, a store, or the like provided with the AP reaches.

In the explanation example of FIG. 1A, the information processing apparatus 70 detects, for example, received signal strength (RSSI: Received Signal Strength Indication/ Received Signal Strength Indicator) of a beacon signal that is a radio wave transmitted by each AP. The beacon signal transmitted by each AP includes identification information for identifying the AP, such as SSID (Service Set Identifier) and MAC (Media Access Control) address (BSSID: Basic Service Set Identifier). The information processing apparatus 70 acquires, for example, the identification information (BSSID) of each AP from the beacon signal transmitted by each AP and detects the reception pattern of the RSSI of each AP according to the location of the information processing apparatus 70.

The information processing apparatus 70 holds, in a database (DB), the identification information of each AP associated with the "place" and place determination information that is the reception pattern of the RSSI of each AP, for example. The place determination information can be stored in the DB or the like by, for example, experimentally measuring in advance the relationship between the location of the information processing apparatus 70 or the like and the reception pattern of the RSSI that changes according to the distance from each AP.

In the example of FIG. 1A, the identification information of each of the AP1 and AP2 installed at home and the reception pattern of the RSSI according to the distance from each AP are stored in a "home RSSI DB" as place determination information. The identification information of each of the AP3 to AP5 installed at an office and the reception pattern of the RSSI according to the distance from each AP are stored in a "conference room RSSI DB" and a "corridor RSSI DB" as place determination information. The reception pattern of the RSSI as the place determination information held in each DB can be illustrated by, for example, a histogram of the reception strength of the RSSI of each AP at the location of the information processing apparatus 70.

In the place detection process of the example of FIG. 1A, the information processing apparatus 70 scans the beacon signal transmitted by each AP at a certain periodic interval, such as 50 ms, at the location of the information processing apparatus 70, for example. The scan of the beacon signal is always executed for the connection to the public wireless LAN or the like. As a result of the scan, the information processing apparatus 70 receives the beacon signal transmitted by each AP to acquire the identification information of each AP and detects the reception pattern of the RSSI of each AP at the location of the information processing apparatus 70.

In the example of FIG. 1A, the SSID that is the identification information of the "AP4" and the "AP5" is acquired from the beacon signal transmitted by each AP at the location of the information processing apparatus 70, and the received RSSIs of the "AP4" and the "AP5" are detected as reception patterns with substantially the same reception strength.

In the place detection process of the information processing apparatus 70, the place determination information stored in the DB or the like associated with the "place" is collated with the identification information of each AP acquired at the location and the reception pattern of the RSSI detected at the location to thereby estimate the location, for example. In the following description, the process of estimating the location by collating the place determination information stored in the DB or the like with the reception pattern of the RSSI detected at the location will be called a place determination process. In the place detection process executed by the information processing apparatus 70 or the like, the scan control for detecting the beacon signal or the like and the place determination process for estimating the location are performed.

For example, it is assumed that the DB of the information processing apparatus 70 holds the "home RSSI DB", the "conference room RSSI DB", and the "corridor RSSI DB" illustrated in FIG. 1A. The SSIDs of the "AP4" and the "AP5" detected at the location of the information processing apparatus 70 and the reception patterns of the RSSIs for the "AP4" and the "AP5" are stored as the place determination information in the "corridor RSSI DB", for example. In the place determination process of the information processing apparatus 70, the place determination information stored in the DB is collated with the SSID of each AP detected at the location of the information processing apparatus 70 and the reception pattern of the RSSI according to the distance from each AP to estimate the location of the information processing apparatus 70, for example. In the information processing apparatus 70, the current location is estimated to be the "corridor of office" as a result of the collation with the place determination information of the "corridor RSSI DB" stored in the DB, for example.

A case in which the information processing apparatus 70 is provided with, for example, an application (application software) of coupons usable in a store or the like will be illustrated. The application is downloaded from a site or the like on the Internet operated by the store or the like through the operation by the person (hereinafter, called "user") using the information processing apparatus 70, and the application is provided to the information processing apparatus 70, for example.

The application provided to the information processing apparatus 70 detects that the location of the information processing apparatus 70 is the "place" associated with the predetermined area of the AP installed at the store or the like, for example. The information processing apparatus 70 that has detected the "place" performs automatic execution of the application, and for example, the coupons usable in the store or the like are displayed on a display screen, such as an LCD, of the information processing apparatus 70 and presented to the user. A service with improved convenience can be provided to the user of the information processing apparatus 70 positioned at the "place" in the predetermined area of the AP installed in the store or the like.

FIG. 1B illustrates a processing block diagram regarding the place detection process of the information processing apparatus 70 of Comparative Example 1. A wireless device 72 illustrated in FIG. 1B is, for example, an interface with the wireless LAN such as Wi-Fi. An A-CPU 71 illustrated in FIG. 1B is a CPU (Central Processing Unit) that executes the application provided to the information processing apparatus 70 and is also called a main CPU, an application CPU, or the like.

As illustrated in FIG. 1B, the control of the wireless device 72 connected to the A-CPU 71 and the place determination process based on the detected identification information of each AP and the reception pattern of the RSSI are performed in the information processing apparatus 70 along with the execution of the place determination process. When the information processing apparatus 70 receives, for example, a coupon service according to the location, the control of the wireless device 72 connected to the A-CPU 71 and the place determination process based on the detected identification information of each AP and the reception pattern of the RSSI are always performed. In the information processing apparatus 70, the power consumption of the wireless LAN device 72 and the A-CPU 71 that executes the place determination process tends to be relatively high. Therefore, when the place detection process is always executed, the operation ratios of the wireless LAN device 72 and the A-CPU 71 are high, and the power of the battery or the like of the information processing apparatus 70 is quickly consumed. As a result, the operating time of the information processing apparatus or the like in the wireless LAN spot or the like is limited, for example.

COMPARATIVE EXAMPLE 2

The A-CPU 71 of the information processing apparatus 70 illustrated in FIG. 1B is designed by using, for example, a fine process with a relatively large operating current or the like in an active state in order to ensure high processing performance. Therefore, the power consumption tends to be high in the A-CPU 71 even in a process with a small amount of computation, for example. The A-CPU 71 of the information processing apparatus 70 is also designed to allow using an external memory or the like with a large storage capacity. The place determination information of a plurality of APs provided at home and at an office as well as in commercial facilities, such as various stores and department stores, in public facilities, such as station premises, airport facilities, other public transportations, and schools, in lodging facilities, and the like that is referenced in the place determination process is stored in the external memory or the like, for example.

In the example of FIG. 1A, each of the "home RSSI DB", the "conference room RSSI DB", and the "corridor RSSI DB" stored in the external memory or the like is referenced to execute the place determination process, for example. The processing load regarding the place determination process of the A-CPU 71 is relatively large compared to when the "corridor RSSI DB" with a small storage capacity is referenced to execute the place determination process, for example. The power consumed by the A-CPU 71 tends to be high in proportion to the increase in the processing load regarding the place determination process of the A-CPU 71, for example.

To reduce the power consumption of the information processing apparatus 70, the information processing apparatus 70 includes, for example, a low-power-consumption microcomputer (hereinafter, also called "power-saving microcomputer") in addition to the A-CPU 71 and can cause the power-saving microcomputer to execute the place detection process.

Figure 1C:
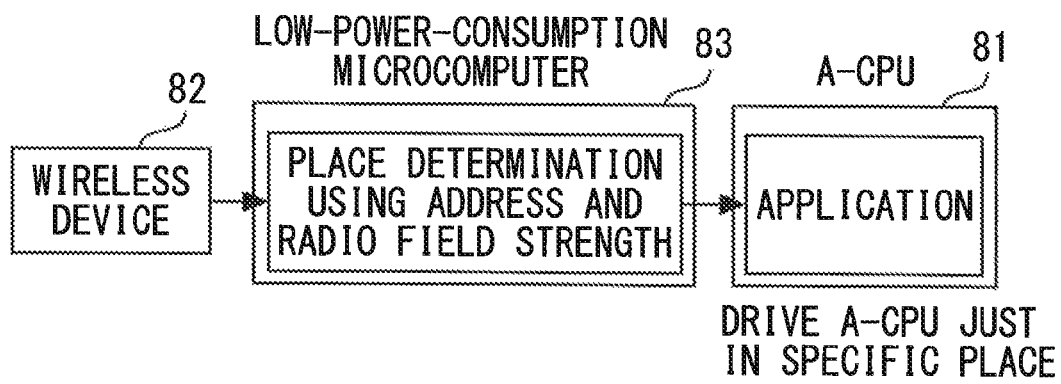
FIG. 1C is an explanatory view of a processing configuration regarding the place detection process of Comparative Example 2.

FIG. 1C illustrates a processing block diagram regarding the place detection process of an information processing apparatus 80 of Comparative Example 2 including a power-saving microcomputer 83. The information processing apparatus 80 illustrated in FIG. 1C includes the power-saving microcomputer 83 independently of an A-CPU 81 for executing an application provided to the information processing apparatus 80.

Like the information processing apparatus 70 of Comparative Example 1, the information processing apparatus 80 of Comparative Example 2 illustrated in FIG. 1C is an information processing apparatus including an interface for connection to the wireless LAN. In the information processing apparatus 80, scan of a beacon signal transmitted by each AP is performed at a certain periodic interval such as 50 ms, at the location of the information processing apparatus 80, for example. In the information processing apparatus 80, the place determination process is executed based on, for example, the identification information of the beacon signal of each AP received at the location of the information processing apparatus 80 and the reception pattern of the RSSI of each AP. In the information processing apparatus 80, the application provided to the information processing apparatus 80 is automatically executed according to, for example, the place that is the location of the information processing apparatus 80 estimated as a result of the place determination process.

In the information processing apparatus 80 illustrated in FIG. 1C, the power-saving microcomputer 83 performs the scan control of a wireless device 82 connected to the power-saving microcomputer 83 and the place determination process based on the detected identification information of each AP and the reception pattern of the RSSI, for example. Like the wireless device 72 illustrated in FIG. 1B, the wireless device 82 is, for example, an interface with the wireless LAN such as Wi-Fi. In the information processing apparatus 80, the result of the place determination process executed by the power-saving microcomputer 83 is transmitted to the A-CPU 81 that executes the application, for example.

In the A-CPU 81 of the information processing apparatus 80, the application of coupons or the like is automatically executed based on, for example, the location of the information processing apparatus 80 notified by the power-saving microcomputer 83. In the information processing apparatus 80 in which the application of coupons or the like is automatically executed, the coupons usable in the store or the like are displayed on, for example, a display screen, such as an LCD, of the information processing apparatus 80.

Here, the power-saving microcomputer 83 is designed by using, for example, a process with a relatively small operating current or the like during activation so that the energy efficiency regarding the operation becomes the highest, and a built-in memory of the power-saving microcomputer 83 is used for the operation. In the power-saving microcomputer 83, the power consumption is relatively reduced compared to the A-CPU 81 in a process with a small amount of computation or in a standby state. In the information processing apparatus 80, the A-CPU 81 can be in, for example, a sleep state in a period in which the scan control of the wireless device 82 by the power-saving microcomputer 83 and the place determination process are performed.

In the period in which the scan control of the wireless device 82 by the power-saving microcomputer 83 and the place determination process are performed, the A-CPU 81 that executes the application can be in the sleep state to reduce the power consumption of the information processing apparatus 70 of Comparative Example 1. The A-CPU 81 can return from the sleep state as a result of the notification of the result of the place determination process by the power-saving microcomputer 83 to execute the application provided to the information processing apparatus 80, for example.

FIG. 1D illustrates an example of the place determination information used in the place determination process by the information processing apparatuses 70 and 80 and the like. As described in FIG. 1A, the place determination information can be expressed by a histogram of the reception strength of the RSSI according to the distance from the installation position of each AP with respect to the location of the information processing apparatus 80 or the like. In the information processing apparatus 80 or the like, the place determination process is executed by, for example, collating the reception pattern of each AP detected at the location of the information processing apparatus 80 or the like with the histogram of the reception strength of the RSSI according to the distance from the installation position of each AP that is the place determination information stored in the DB or the like.

In the example of FIG. 1D, the place determination information includes records of each "place" indicating the location of the information processing apparatus 80 or the like, and each record is expressed by a histogram of the RSSI of each AP associated with the "place". In the histogram of the RSSI of each AP, the strength of the RSSI is divided into a plurality of sections (hereinafter, the divided sections will also be called "bins"), and a certainty for estimating the "place" is associated as a likelihood with each of the divided sections.

In the place determination information, the location of the information processing apparatus 80 or the like can be the "place", and the histogram of the RSSI of each AP in the "place" can be experimentally measured in advance, for example. The relationship between the reception strength of the RSSI of each AP measured in each "place" and the certainty of the "place" estimation can be experimentally acquired, and the likelihood can be set in association with the RSSI of the place determination information corresponding to each "place".

The place determination information illustrated in FIG. 1D includes records of a "place L1" and a "place L2". Each record stores the histogram of the RSSI of each AP detected in each place. The place determination information illustrated in FIG. 1D is an explanation example in which the number of APs stored in each "place" record is "3", and the number of sections (hereinafter, also called "the number of bins") of the histogram of the RSSI is "4".

For example, the records illustrated in FIG. 1D include columns of the identification information of each AP detected in each place ("12:34:56:78:90:AB(=a1)", "12:34:56:78:90:AC(=a2)", and "12:34:56:78:90:AD(=a3)"). In the columns of each SSID, the histogram of the RSSI detected for each SSID is set in four stages, such as "−40 or more", "−40 to −60", "−60 to −80", and "not detected". Each RSSI is associated with the likelihood according to the detection of each RSSI. For example, in the column "12:34:56:78:90:AB(=a1)" of the record "place L1", the likelihood "0.6" is associated with the RSSI "−40 or more". Similarly, the likelihood "0.25" is associated with the RSSI "−40 to −60" of the same column, "0.1" is associated with "−60 to −80", and "0.05" is associated with "not detected".

In the example of FIG. 1D, the identification information of AP "12:34:56:78:90:AB" or the like indicates the BSSID that is the address of the AP, and "a1" or the like indicates the SSID that is the name of the AP, for example.

When the likelihood of each RSSI of each AP stored in the record of the "place L1" is relatively compared, the likelihood for the RSSI "−40 or more" is relatively high in (a1), and the likelihood for the RSSI "not detected" is relatively high in (a2). Similarly, the likelihood for the RSSI "−60 to −80" is high in (a3). Therefore, it can be recognized that in the information processing apparatus 80 or the like positioned in the "place L1", the degree of detection is high in the histograms with the RSSI "−40 or more" of (a1), the RSSI "not detected" of (a2), and the RSSI "−60 to −80" of (a3).

Similarly, when the likelihood of each RSSI of each AP stored in the record of the "place L2" is relatively compared, the likelihood for the RSSI "−40 to −60" is relatively high in (a1), and the likelihood for the RSSI "−60 to −80" is relatively high in (a2). The likelihood for the RSSI "−40 or more" is high in (a3). It can be recognized that in the information processing apparatus 80 or the like positioned in the "place L2", the degree of detection is high in the histograms with the RSSI "−40 to −60" of (a1), the RSSI "−60 to −80" of (a2), and the RSSI "−40 or more" of (a3).

As illustrated in FIG. 1D, the place determination information is expressed by the histogram of the RSSI divided into a plurality of bins for each of the plurality of APs detected in each "place". Although the number of APs is three and the number of bins of the RSSI is four in the explanation example of FIG. 1D, the number of APs and the number of bins of the place determination information stored in the DB or the like during the operation are often much more than the numbers set in the explanation example in order to increase the accuracy of the place determination.

For example, assuming that the number of APs of the place determination information stored in the DB or the like is "20" spots and that the number of bins of the RSSI is "12", the memory capacity regarding the place determination information of each place is "20×12×2=480" bytes if the likelihood information associated with each bin is "2 bytes". For example, if places of ten spots are defined in each floor of the office illustrated in FIG. 1A, the memory capacity of "10×2×480=9600" bytes is consumed in two floors.

As illustrated in FIG. 1C, the place determination process for the location of the information processing apparatus 80 is executed by the power-saving microcomputer 83 in the information processing apparatus 80 of Comparative Example 2. The power-saving microcomputer 83 is operated by using, for example, the built-in memory of the power-saving microcomputer 83. Here, the capacity of a RAM (Random Access Memory) that is the built-in memory of the power-saving microcomputer 83 is limited to, for example, several dozen KB (kilobytes). Therefore, the information processing apparatus 80 including the power-saving microcomputer 83 does not hold the place determination information of all floors of the office illustrated in FIG. 1A in some cases, for example.

COMPARATIVE EXAMPLE 3

For the power-saving microcomputer 83 of Comparative Example 2, it can be proposed to narrow down the area range of the place determination information collated in the place determination process and hold the information in the built-in memory and to exchange the area range of the determination information held in the built-in memory as a result of detection of a specific place that is set in advance, for example. In the power-saving microcomputer 83 in which the area range of the place determination information held in the built-in memory is exchanged, the place determination process can be continuously executed based on the area range of the place determination information after the exchange, and the limited capacity of the built-in memory can be effectively utilized.

Figure 2A:
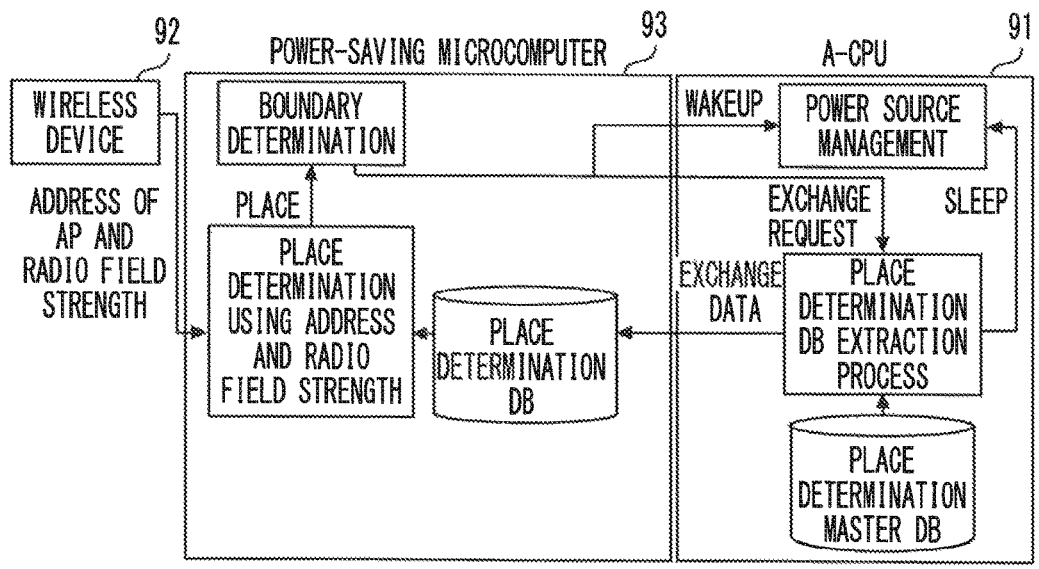
FIG. 2A is an explanatory view of a processing configuration of an information processing apparatus of Comparative Example 3.

FIG. 2A illustrates a processing block diagram of an information processing apparatus 90 of Comparative Example 3. The information processing apparatus 90 of Comparative Example 3 includes, for example, a power-saving microcomputer 93 that detects a specific place which is set in advance and that executes an exchange process of the area range of the place determination information held in a built-in memory as a result of the detection of the place.

Like the information processing apparatus 80 of Comparative Example 2, the information processing apparatus 90 of Comparative Example 3 illustrated in FIG. 2A is an information processing apparatus including the power-saving microcomputer 93 and a wireless device 92 that is an interface for connection to the wireless LAN. In the information processing apparatus 90, the power-saving microcomputer 93 performs the scan control of the wireless device 92 connected to the power-saving microcomputer 93 and the place determination process based on the detected identification information of each AP and the reception pattern of the RSSI, for example. The place determination process is executed by, for example, collating the reception pattern of each AP detected at the location of the information processing apparatus 90 with the histogram of the reception strength of the RSSI of each AP in the area range of the place determination information held in the place determination DB.

In the information processing apparatus 90, the power-saving microcomputer 93 performs boundary determination for the location of the information processing apparatus 90 estimated in the place determination process, for example. In the boundary determination, whether the location of the information processing apparatus 90 estimated in the place determination process is a specific place (boundary) that is set in advance is determined, for example.

Figure 2B:
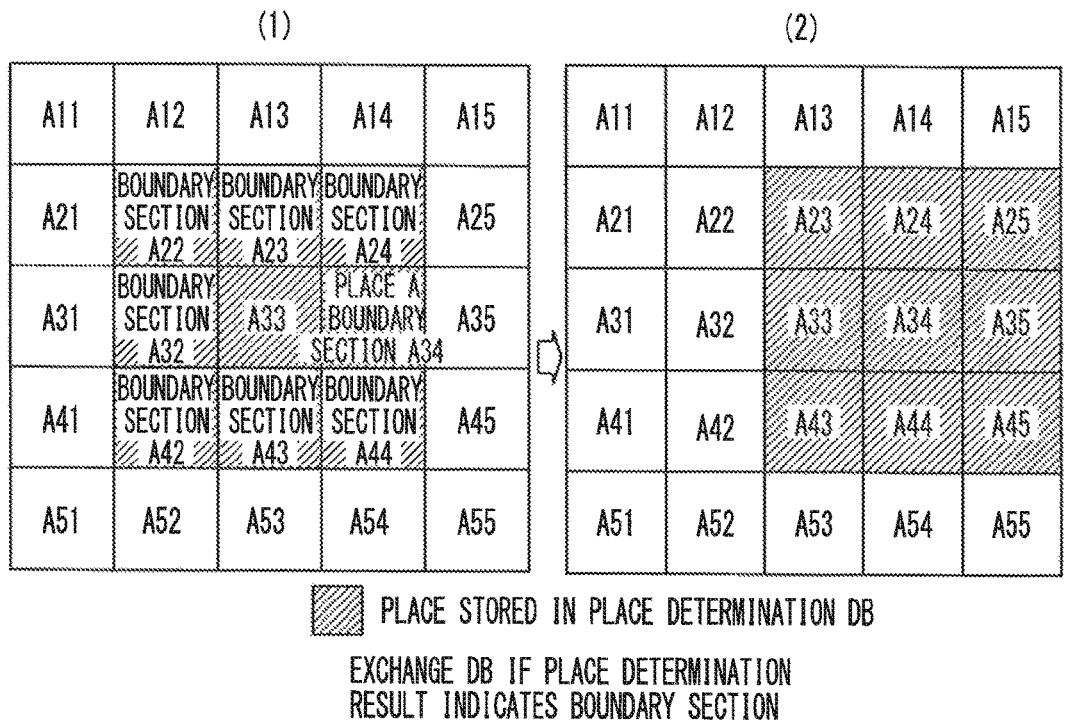
FIG. 2B is an explanatory view explaining boundary determination of Comparative Example 3.

FIGS. 2B(1) and 2B(2) illustrate explanatory views of the boundary determination. In the explanatory views illustrated in FIGS. 2B(1) and 2B(2), rectangular areas A11 to A15, A21 to A25, A31 to A35, A41 to A45, and A51 to A55 indicate the place determination information of single place. Here, the single place denotes the record of each "place" in the explanation example of FIG. 1D, for example. For example, in the example of FIG. 1D, the record of the "place L1" is equivalent to the place determination information of the rectangular area A11, and the record of the "place L2" is equivalent to the place determination information of the rectangular area A12.

The explanatory view of FIG. 2B(1) illustrates a state before exchange of the place determination information held in the place determination DB, and the explanatory view of FIG. 2B(2) illustrates a state in which the place determination information is exchanged for the place determination DB.

The rectangular areas A22 to A24, A32 to A34, and A42 to A44 hatched with oblique lines rising up and to the right in FIG. 2B(1) indicate the area range of the place determination information of the place determination DB held in the built-in memory of the power-saving microcomputer 93 illustrated in FIG. 2A, for example. In the rectangular areas A22 to A24, A32, A34, and A42 to A44 hatched with oblique lines rising up and to the right, specific places, such as boundary sections, for exchanging the area range of the place determination information held in the place determination DB are set in advance, for example.

The specific places are set by, for example, flag information indicating binary states, such as "0" and "1", by a single bit. In the flag information, a state value "1" is set for a specific place such as a boundary section, and a state value "0" is set for places other than the specific place, for example. The flag information is stored in, for example, the place determination DB associated with the identification information for identifying the place such as the "place L1".

In the explanation example of FIG. 2B(1), it is assumed that the location of the information processing apparatus 90 is estimated to be A34 in the place determination process of the power-saving microcomputer 93 illustrated in FIG. 2A. In the information processing apparatus 90 of Comparative Example 3, if it is detected in the place determination process that the location of the information processing apparatus 90 is a specific place that is set in advance, such as a boundary section, the area range of the place determination information of the place determination DB held in the built-in memory of the power-saving microcomputer 93 is exchanged.

In the explanatory view of FIG. 2B(2), the rectangular areas A23 to A25, A33 to A35, and A43 to A45 hatched with oblique lines rising up and to the right indicate the area range of the place determination information of the place determination DB held in the built-in memory of the power-saving microcomputer 93 after the exchange. In the exchange of the place determination information, the area range of the place determination information is exchanged so that, for example, the location A34 of the information processing apparatus 90 is included, and the place determination information for A34 does not include the flag information indicating a specific place, such as a boundary section, as illustrated in FIG. 2B(2). In the area range of the place determination information of the place determination DB after the exchange, the specific places, such as boundary sections, for exchanging the place determination information are set in the rectangular areas A23 to A25, A33, A35, and A43 to A45 hatched with oblique lines rising up and to the right, for example.

In the explanatory view of FIG. 2B(1), the place determination information is similarly exchanged for other boundary sections. For example, it is assumed that the location of the information processing apparatus 90 is estimated to be the boundary section A32 in which the specific place is set in advance. As a result of the boundary determination, the area range of the place determination information of the place determination DB of the information processing apparatus 90 is exchanged to, for example, the rectangular areas A21 to A23, A31 to A33, and A41 to A43. The specific places, such as boundary sections, based on the flag information for exchanging the area range of the place determination information held in the place determination DB are set in the rectangular areas A21 to A23, A31, A33, and A41 to A43, for example.

The exchange of the area range of the place determination information held in the place determination DB of the power-saving microcomputer 93 can be performed by, for example, an A-CPU 91 to which a large-capacity external memory can be connected. For example, the large-capacity external memory included in the A-CPU 91 illustrated in FIG. 2A holds a place determination master DB. The place determination master DB holds the place determination information of all floors of the office illustrated in FIG. 1A, for example.

In the information processing apparatus 90 of Comparative Example 3, when, for example, the power-saving microcomputer 93 detects that the location is a boundary section or the like, the power-saving microcomputer 93 can issue an exchange request of the area range of the place determination information to the A-CPU 91 to which the large-capacity external memory is connected.

For example, as illustrated in FIG. 2A, the place determination process of the power-saving microcomputer 93 handles the result of the place determination process as the location of the information processing apparatus 90 and transfers it to the process of boundary determination along with the flag information indicating the specific place associated with the "place". In the process of boundary determination of the power-saving microcomputer 93, whether the location of the information processing apparatus 90 estimated in the place determination process is a specific place that is set in advance is determined based on the flag value of the flag information associated with the "place". If the location of the information processing apparatus 90 is a specific place, such as a boundary section, that is set in advance, the power-saving microcomputer 93 can issue an exchange request of the area range of the place determination information to the A-CPU 91 to which the large-capacity external memory is connected.

The exchange request of the area range of the place determination information for the place determination DB from the power-saving microcomputer 93 is received as, for example, an interrupt request for a process of power source management by the A-CPU 91. In the process of power source management by the A-CPU 91 that has received the interrupt request, the A-CPU 91 is started and restored from the sleep state as a result of the reception of the interrupt request.

The exchange request of the area range of the place determination information for the place determination DB from the power-saving microcomputer 93 is received in, for example, a place determination DB extraction process of the A-CPU 91 returned from the sleep state. The exchange request of the place determination DB received in the place determination DB extraction process of the A-CPU 91 includes, for example, the "place" information that is the location of the information processing apparatus 90 estimated in the place determination process of the power-saving microcomputer 93.

In the place determination DB extraction process of the A-CPU 91, an extraction process of the area range of the place determination information from the place determination master DB is executed based on the "place" information that is the location of the information processing apparatus 90, for example. For example, in the place determination DB extraction process of the A-CPU 91, the place determination master DB stored in the external memory is searched based on the "place" information that is the location of the information processing apparatus 90. In the place determination DB extraction process of the A-CPU 91, the place determination information of a local area including the "place" information that is the location of the information processing apparatus 90 is extracted from the place determination information stored in the place determination master DB, for example.

For example, if the "place" information indicates the rectangular area A34 illustrated in FIG. 2B(1), an area range of the place determination information for A23 to A25, A33 to A35, and A43 to A45 including the rectangular area A34 is extracted from the place determination master DB in the place determination DB extraction process. For example, if the "place" information indicates the rectangular area A42 illustrated in FIG. 2B(1), an area range of the place determination information for A31 to A33, A41 to A43, and A51 to A53 including the rectangular area A42 is extracted from the place determination master DB in the place determination DB extraction process.

In the place determination DB extraction process of the A-CPU 91, a specific place, such as a boundary section, for exchanging the area range of the place determination information held in the place determination DB is set for the extracted place determination information, for example. The specific place is set by, for example, associating the "place" information with the flag information.

For example, if the "place" information indicates A34, flag information with the flag value "0" is associated with the place determination information for A34 in the place determination DB extraction process. Flag information with the flag value "1" is associated with the place determination information for A23 to A25, A33, A35, and A43 to 45 in the place determination DB extraction process. A23 to A25, A33, A35, and A43 to A45 associated with the flag information with the flag value "1" serve as the specific places, such as boundary sections, for exchanging the place determination information held in the place determination DB illustrated in FIG. 2B(1), for example.

In the place determination DB extraction process by the A-CPU 91, the area range of the place determination information extracted from the place determination master DB, in which the flag information is set, and the area range of the place determination information of the place determination DB, for which the exchange request is issued, are exchanged. The data of the place determination DB held in the built-in memory of the power-saving microcomputer 93 is exchanged with the area range of the place determination information extracted from the place determination master DB in which the flag information indicating the specific place for exchanging the place determination information held in the place determination DB is set.

In the place determination DB extraction process by the A-CPU 91, an interrupt request for the process of the power source management by the A-CPU 91 is issued as a result of the completion of the exchange of the area range of the place determination information of the place determination DB, for example. In the process of the power source management by the A-CPU 91, the A-CPU 91 is shifted to the sleep state based on the interrupt request issued from the place determination DB extraction process.

As described, in the information processing apparatus 90 of Comparative Example 3, the place determination information of the local area according to the location can be extracted from the place determination information for all floors of the office illustrated in FIG. 1A, and the information can be held as the place determination DB in the built-in memory of the power-saving microcomputer 93, for example. The area range of the place determination information held in the place determination DB is associated with, for example, the flag information for exchanging the data of the place determination DB. Therefore, even if the "place" of the location is changed along with the movement, the information processing apparatus 90 can exchange the area range of the place determination information held in the place determination DB of the power-saving microcomputer 93 based on the flag information or the like associated with the "place", for example. In the information processing apparatus 90, the exchange of the place determination information is repeated every time there is a movement to the "place" associated with the flag information, for example. For example, in the information processing apparatus 90, the built-in memory of the power-saving microcomputer 93 can cover the place determination information of all floors of the office illustrated in FIG. 1A.

In the information processing apparatus 90 of Comparative Example 3, the limited capacity of the built-in memory can be effectively utilized, and the place determination process can be continuously executed even if there is a movement of the place. The place determination information of the local area extracted according to the movement of the place includes the same amount of information as the place determination master DB stored in the large-capacity external memory connected to the A-CPU 91. Therefore, the place determination process of the information processing apparatus 90 of Comparative Example 3 can ensure the accuracy equivalent to the accuracy of the place determination process executed by the information processing apparatus 70 illustrated in Comparative Example 1.

In the information processing apparatus 90 of Comparative Example 3, the area range of the place determination information held in the place determination DB is exchanged based on, for example, the flag information that is set in advance in association with the "place" information. The place determination information held in the place determination DB for estimating the "place" is indicated by the SSID of each AP detected in the "place" and the histogram of the RSSI of each SSID, as described in FIG. 1D. Therefore, the information processing apparatus 90 of Comparative Example 3 does not estimate the location in an area in which the place determination information for estimating the "place" is not defined, and the boundary determination is not performed. Therefore, the exchange request of the place determination DB is not issued to the A-CPU 91 in some cases. Examples of the area in which the place determination information for estimating the "place" is not defined include an area in which the AP of the wireless LAN is not provided and an area not registered in the place determination master DB.

Figure 3A:
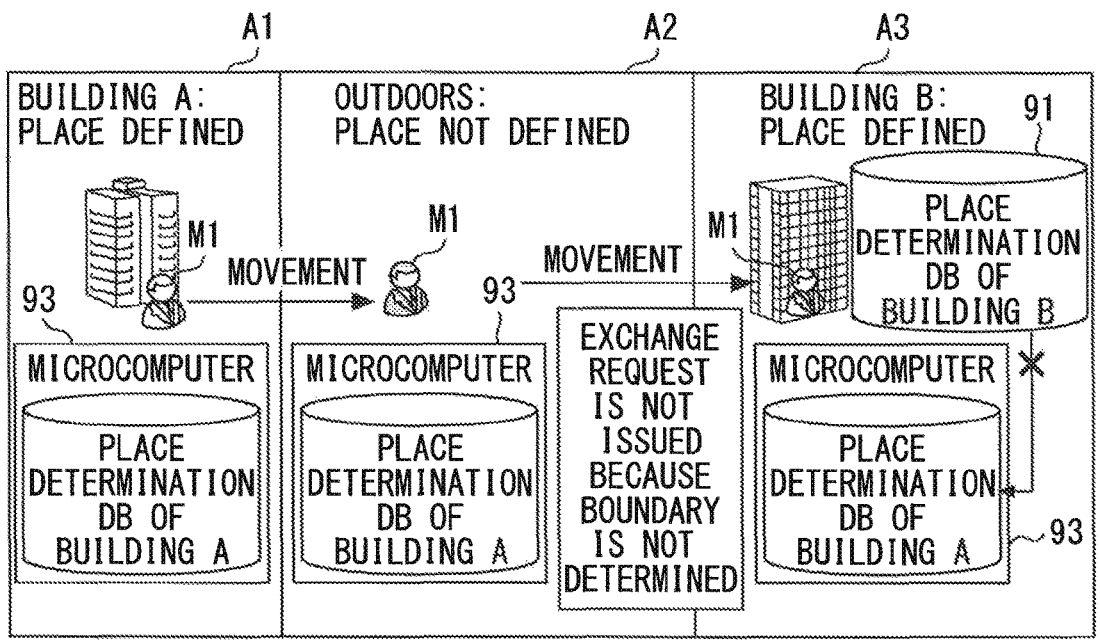
FIG. 3A is an explanatory view explaining exchange of a place determination DB in an area in which place determination information is not defined.

FIG. 3A illustrates an explanatory view of the exchange of the place determination DB through an area in which the place determination information is not defined. In the explanatory view illustrated in FIG. 3A, areas A1 and A3 are areas registered in the place determination master DB, for example. In the area A1, the information processing apparatus 90 can estimate the location of the information processing apparatus 90 based on the place determination information associated with a building A. Similarly, in the area A3, the information processing apparatus 90 can estimate the location of the information processing apparatus 90 based on the place determination information associated with a building B.

On the other hand, an area A2 is, for example, an area in which the place determination information is not defined, such as an area in which the AP of the wireless LAN is not provided and an area not registered in the place determination master DB. In the area A2, the information processing apparatus 90 does not estimate the location of the information processing apparatus 90 because the place determination information is not defined.

It is assumed that a user M1 of the information processing apparatus 90 moves from the area A1 in which the place determination information is defined, through the area A2 in which the place determination information is not defined, to the area A3 in which the place determination information is defined again. For example, around the entrance of the building A of the area A1, the information processing apparatus 90 can receive the beacon signal or the like transmitted by each AP provided to the building A. Therefore, the place determination information of the local area corresponding to around the entrance of the building A after the exchange is stored in the place determination DB held by the power-saving microcomputer 93 of the information processing apparatus 90 positioned around the entrance of the building A of the area A1.

Along with the movement of the user M1 to the area A2, the power-saving microcomputer 93 of the information processing apparatus 90 continuously executes the place determination process at the location of the area A2 based on the place determination information of the area corresponding to around the entrance of the building A held in the place determination DB.

However, if the area A2 is, for example, an area in which the AP of the wireless LAN is not provided, the information processing apparatus 90 does not estimate the location of the information processing apparatus 90 because a receivable beacon signal is not detected. Furthermore, if the place determination information is not registered in the place determination master DB for example, the information processing apparatus 90 does not estimate the location of the information processing apparatus because there is no place detection information in the place determination DB, even if a receivable beacon signal is detected. As a result, the data of the place determination DB held by the power-saving microcomputer 93 is not exchanged in the information processing apparatus 90 positioned in the area A2, and there is a movement to the area A3 in a state that the place determination information of the area corresponding to around the entrance of the building A is held in the place determination DB.

In the area A3, the information processing apparatus 90 can receive, for example, the beacon signal transmitted by each AP provided to the building B. The place determination information of each AP provided to the building B is registered in, for example, the place determination master DB of the external memory connected to the A-CPU 91. However, the place determination DB of the power-saving microcomputer 93 in which the place determination process is executed holds the place determination information of the area corresponding to around the entrance of the building A of the area A1.

Therefore, in the information processing apparatus 93 of the area A3, the location is not estimated even if the place determination process by the power-saving microcomputer 93 is executed, because the place determination DB does not hold the place determination information of each AP provided to the building B. The boundary determination according to the location is not performed in the information processing apparatus 93 that does not estimate the location, and the exchange request of the data of the place determination DB is not issued to the A-CPU 91 including the place determination master DB. As a result, even if there is a movement to the area A3 of the building B registered in the place determination master DB, the area range of the place determination information of the place determination DB held in the built-in memory of the power-saving microcomputer 93 is not exchanged with the place determination information according to the area A3 of the building B.

For example, to exchange the place determination DB with the place determination information of the building B registered in the place determination master DB, the place determination information of the area around the area A2 can be extracted from the place determination master DB and stored in the place determination DB in the area A2 in which the place determination information is not defined.

Figure 3B:
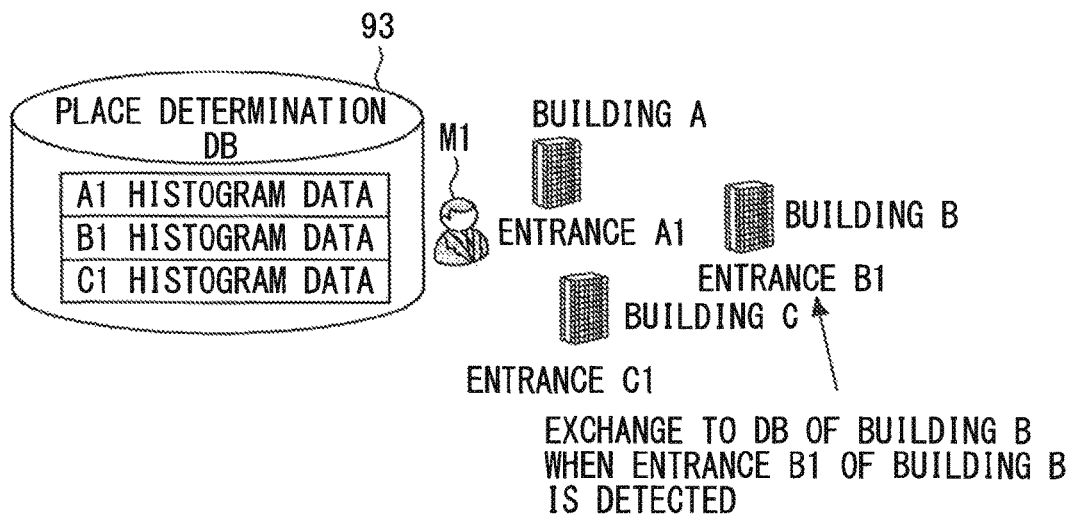
FIG. 3B is an explanatory view of the place determination information in a peripheral area of the area in which the place determination information is not defined.

FIG. 3B illustrates an explanatory view of the place determination information around the area A2, in the area A2 in which the place determination information is not defined. It is assumed that the user M1 of the information processing apparatus 90 is positioned in the area A2 in which the place determination information is not defined. It is also assumed that there are buildings A, B, and C around the area A2 and that the place determination information of each building is registered in, for example, the place determination master DB of the A-CPU 91.

In the information processing apparatus 90 positioned in the area A2, the area range of the place determination information of the place determination DB held in the built-in memory of the power-saving microcomputer is exchanged based on, for example, a predetermined condition. Here, an example of the predetermined condition includes that the beacon signal transmitted by each AP is not detected and that the identification information of each AP acquired from the beacon signal and the reception pattern of the RSSI of each AP do not match any of the place determination information held in the place determination DB.

In the information processing apparatus 90, the A-CPU 91 in the sleep state can be started based on the predetermined condition, and the place determination information of the buildings A, B, and C can be extracted from the place determination master DB in the place determination DB extraction process to exchange the place determination DB, for example. The place determination information extracted from the place determination master DB can be, for example, the place determination information corresponding to the areas around the entrances of the buildings A, B, and C. In the place determination DB extraction process, the extracted place determination information of the areas corresponding to around the entrances of the buildings A, B, and C can be associated with the flag information for exchanging the place determination DB such as the boundary section, for example.

For example, the information processing apparatus 90 that has moved to the area A3 of the building B estimates that the location of the information processing apparatus 90 is around the entrance of the building B based on the area range of the place determination information held in the place determination DB. The "place" information around the entrance of the building B is associated with the flag information for exchanging the place determination DB, and the boundary determination based on the location is possible in the power-saving microcomputer 93 of the information processing apparatus 90. As a result, the A-CPU 91 can be started in the information processing apparatus 90 that has moved to the area A3 of the building B, and the area range of the place determination information held in the place determination DB of the power-saving microcomputer 93 can be exchanged with the place determination information of the area according to the area A3 of the building B.

However, the capacity of the built-in memory of the power-saving microcomputer 93 is small, and the amount of data of the histogram data of the RSSI of each AP of the place determination information is large. Therefore, the amount of data of the place determination information that can be held in the place determination DB is limited. For example, when 100 spots are registered as the place determination information of the peripheral area of the area A2, the memory capacity of "480 bytes×100=48 KB" is consumed for the amount of data. Therefore, the amount of data of the place determination information of the peripheral area of the area A2 extracted from the place determination master DB of the A-CPU 93 is not stored in the built-in memory of the power-saving microcomputer 93 in some cases.

For example, although it can be assumed that the number of bins of the RSSI of each AP of the place determination information is reduced to reduce the amount of data of the histogram data, the place determination accuracy is not ensured. When the place determination information of the area range effective for the place determination of the destination is held in the place determination DB in a state that the place determination accuracy is ensured, the processing may be difficult in the power-saving microcomputer 93. Therefore, in the information processing apparatus 90 of the user M1 who moves from the area A1 to the area A3 of FIG. 3A, processing by the A-CPU 91 needs to be executed in the place determination process of estimating the location of the information processing apparatus 90, and it is difficult to reduce the power consumption.

[Embodiment]

In the information processing apparatus 90 of Comparative Example 3 illustrated in FIG. 2A, the boundary determination is performed based on, for example, the "place" information estimated in the place determination process by the power-saving microcomputer 93 and the flag information associated with the "place" information, and the place determination DB is exchanged.

An information processing apparatus of the present embodiment includes, for example, an exchange request determination DB in a built-in memory of a power-saving microcomputer, in addition to a place determination DB for estimating the location of the information processing apparatus. Identification information of AP for determining the exchange request of the data held in the place determination DB and the exchange request determination DB are stored in the exchange request determination DB, for example. Here, the memory area used in the place determination DB of Comparative Example 3 is divided into, for example, a data holding area of the place determination DB and a data holding area of the exchange request determination DB in the information processing apparatus of the present embodiment. The identification information of AP stored in the exchange request determination DB includes, for example, MAC address (BSSID) of AP, SSID, ESSID (Extended SSID), and the like.

In the information processing apparatus of the present embodiment, the power-saving microcomputer has a function of determining an exchange request of the data held in the place determination DB and the exchange request determination DB based on the identification information of AP stored in the exchange request determination DB, for example. In the power-saving microcomputer of the information processing apparatus of the present embodiment, the determination of the exchange request is performed by, for example, collating the identification information of AP acquired through a wireless device that is an interface with the wireless LAN, with the identification information of AP stored in the exchange request determination DB.

The power-saving microcomputer of the information processing apparatus of the present embodiment issues an exchange request of the data held in the place determination DB and the exchange request determination DB to an A-CPU including a place determination master DB based on the result of the determination of the exchange request, for example. The A-CPU that has received the exchange request of the data held in the place determination DB and the exchange request determination DB from the power-saving microcomputer returns from the sleep state to execute an extraction process for exchanging the data held in the place determination DB and the exchange request determination DB, for example.

In the extraction process of the A-CPU, an extraction process for exchanging the area range of the place determination information held in the place determination DB, from the place determination information registered in the place determination master DB, is executed based on the identification information of AP registered in the exchange request determination DB, for example. In the extraction process of the A-CPU, the identification information of AP detected in the "place" around the extracted area range of the place determination information is extracted along with the extraction process of the area range of the place determination information, for example.

If the location does not match any of the place determination information held in the place determination DB in the determination of the exchange request of the power-saving microcomputer of the information processing apparatus of the present embodiment, the information processing apparatus releases the memory use area of the place determination DB to set a free space, for example. The use areas of the place determination DB and the exchange request determination DB of the built-in memory of the power-saving microcomputer are allocated based on the amounts of data used by the DBs. Therefore, in the power-saving microcomputer of the information processing apparatus, the memory area allocated to the place determination DB can be released to set a free space to thereby expand the memory area of the exchange request determination DB based on the released memory area.

In the determination of the exchange request of the power-saving microcomputer of the information processing apparatus, an exchange request of the data held in the exchange request determination DB is issued to the A-CPU including the place determination master DB, for example. When the location of the information processing apparatus does not match any of the place determination information held in the place determination DB, the exchange request is issued to the A-CPU without adding the identification information of AP in the determination of the exchange request of the power-saving microcomputer, for example.

The A-CPU that has received the exchange request of the data held in the exchange request determination DB from the power-saving microcomputer returns from the sleep state and executes an extraction process for exchanging the data held in the exchange request determination DB, for example. In the extraction process of the A-CPU, an extraction process of the identification information of AP stored in the exchange request determination DB is executed based on, for example, the information of the area range of the place determination information of the place determination DB performed during the most recent exchange request. The extracted identification information of AP is, for example, the identification information of AP detected in the "place" around the area range of the place determination information stored in the place determination DB during the most recent exchange request. In the example of FIG. 3B, the identification information of AP detected in the "places" around the entrances of the buildings A, B, and C is included, for example.

When the memory use area of the place determination DB is released, the memory area of the exchange request determination DB of the power-saving microcomputer is expanded, for example. The data stored in the exchange request determination DB is the identification information of AP corresponding to the "place", and the amount of data is small compared to the histogram data of the RSSI of each AP of the place determination information. Therefore, in the exchange request determination DB in which the allocated memory area is expanded, the identification information of AP corresponding to the "place" of a wider range can be held as information for determining the exchange request of the data held in the place determination DB and the exchange request determination DB.

For example, when the place determination information (histogram data) of the place determination DB of FIG. 3B is used, a memory area of 480 bytes is used for each place if the number of APs detected in each place is 20, the number of bins is 12, and the likelihood information is "2 bytes". In the information processing apparatus of the present embodiment, the identification information of AP is adopted as the determination information for exchanging each DB. Therefore, when the identification information of AP is BSSID, the used memory area can be handled by six bytes for one AP, for example. The information processing apparatus of the present embodiment can hold the BSSIDs of about 80 spots in the amount of memory used for the histogram data of a single place. As a result, dozens of times of candidate places can be held as the determination information for exchanging each DB in the information processing apparatus of the present embodiment, compared to when the place determination information of each place is held.

The information processing apparatus of the present embodiment repeatedly executes the exchange request of the data held in the place determination DB and the exchange request determination DB based on the identification information of AP corresponding to the "place" stored in the exchange request determination DB in which the capacity of the memory area is expanded. As a result, the area range of the place determination information of the place determination DB can be exchanged in the information processing apparatus of the present embodiment even when, for example, there is a movement from the area A2 to the area A3 illustrated in FIG. 3A. The information processing apparatus of the present embodiment can continuously execute the place determination process based on the area range of the place determination information held in the place determination DB after the exchange even if the information processing apparatuses passes through an area in which the place determination information is not defined.

In the information processing apparatus of the present embodiment, a technique can be provided, in which the power consumption is reduced, and a place of a wide range is detected while the detection accuracy of place detection is maintained, for example.

[Configuration of Apparatus]

FIG. 4 illustrates an example of a configuration of hardware of an information processing apparatus 10 of the present embodiment. The information processing apparatus 10 illustrated in FIG. 4 is, for example, an information processing apparatus including a wireless device 11 that is an interface for connection to a wireless LAN. Examples of the information processing apparatus including the wireless device 11 include a mobile phone, a smartphone, a notebook PC, a tablet PC, a PDA, and a game machine. Other examples include a PC, a car navigation apparatus, a digital audio player, and a digital camera. An example of a communication standard of the wireless LAN includes Wi-Fi.

The information processing apparatus 10 illustrated in FIG. 4 includes a CPU 11, a storage unit 13, an input unit 14, an output unit 15, and a communication unit 16 that are connected to each other by a connection bus or the like. The storage unit 13 is a recording medium readable by the information processing apparatus 10. The information processing apparatus 10 illustrated in FIG. 4 also includes a low-power-consumption microcomputer (hereinafter, called "power-saving microcomputer") 12 connected to the connection bus or the like. The CPU 11 is also called an "application CPU", an "A-CPU", and a "first processor", and the power-saving microcomputer 12 is also called a "second processor".

In the information processing apparatus 10, the CPU 11 expands a program stored in the storage unit 13 to a work area of the storage unit 13 to allow execution and controls a peripheral device through the execution of the program. In the information processing apparatus 10, the power-saving microcomputer 12 expands a program stored in a built-in memory 21 to a work area of the built-in memory to allow execution and controls a peripheral device through the execution of the program. In this way, the information processing apparatus 10 can implement a function according to a predetermined object.

In the information processing apparatus 10 illustrated in FIG. 4, the CPU 11 (application CPU) that is the first processor is a central processing unit that controls the entire information processing apparatus 10. The CPU 11 executes a process according to a program stored in the storage unit 13. The storage unit 13 includes a storage medium in which the CPU 11 caches a program or data and expands a work area. The storage unit 13 includes, for example, a ROM (Read Only Memory) 13a and a RAM 13b.

The power-saving microcomputer 12 that is the second processor implements a place detection function regarding the location of the information processing apparatus 10. The power-saving microcomputer 12 executes a process according to a program stored in the built-in memory 21. The built-in memory 21 is a storage medium readable by the power-saving microcomputer 12 and includes a storage medium in which the power-saving microcomputer 12 caches a program or data and expands a work area. The built-in memory 21 includes, for example, a ROM 21a and a RAM 21b.

The storage unit 13 stores various programs and various data in a recording medium in a readable and writable manner. The storage unit 13 is also called an external storage device. The storage unit 13 stores an operating system (OS), various programs, various tables, and the like. The OS includes a communication interface program for transmitting and receiving data to and from an external device or the like connected through the communication unit 16. Examples of the external device or the like include an information processing apparatus, such as another server, an external storage device, an apparatus with a communication function, and the like on a network connection through the communication unit 16.

The storage unit 13 includes, for example, an EPROM (Erasable Programmable ROM), a solid-state drive apparatus, a hard disk drive (HDD) apparatus, and the like. Examples of the storage unit 12 can include a CD drive apparatus, a DVD drive apparatus, and a BD (Blu-ray (registered trademark) Disc) drive apparatus. Examples of the recording medium include a silicon disk including a non-volatile semiconductor memory (flash memory), a hard disk, a CD, a DVD, a BD, a USB (Universal Serial Bus) memory, a memory card, and the like.

The input unit 14 receives an operational instruction or the like from the user or the like. The input unit 14 is a pointing device, such as an input button, a keyboard, and a touch panel 14a, and is an input device, such as a wireless remote control, a microphone 14b, and a camera. The input unit 14 also includes a GPS (Global Positioning System) receiver 14c, an NFC (Near Field Communication) reader 14d, a microphone 14e, and various sensors for detecting the position of the information processing apparatus 10, such as a magnetic sensor 14f and an acceleration sensor 14g. Information input from the input unit 14 is transmitted to the CPU 11 and the power-saving microcomputer 12 through a connection bus B1.

The output unit 15 outputs data processed by the CPU 11 (application CPU) and data stored in the storage unit 12. The output unit 15 is an output device, such as a CRT (Cathode Ray Tube) display, an LCD (Liquid Crystal Display) 15a, a PDP (Plasma Display Panel), an EL (Electroluminescence) panel, an organic EL panel, a printer, and a speaker 15b.

The communication unit 16 is, for example, an interface to a network or the like. Examples of the network connected by the information processing apparatus 10 include a public network, such as a wireless LAN and Internet, and a wireless network, such as a mobile phone network including a communication base station. The communication unit 16 includes: a wireless device 16a that is an interface of the wireless LAN or the like; and a mobile communication modem device 16b that is an interface of the mobile phone network or the like including the communication base station. The wireless device 16a and the mobile communication modem device 16b are connected to antennas 16c and 16d, respectively, which can transmit and receive radio waves.

Figure 5:
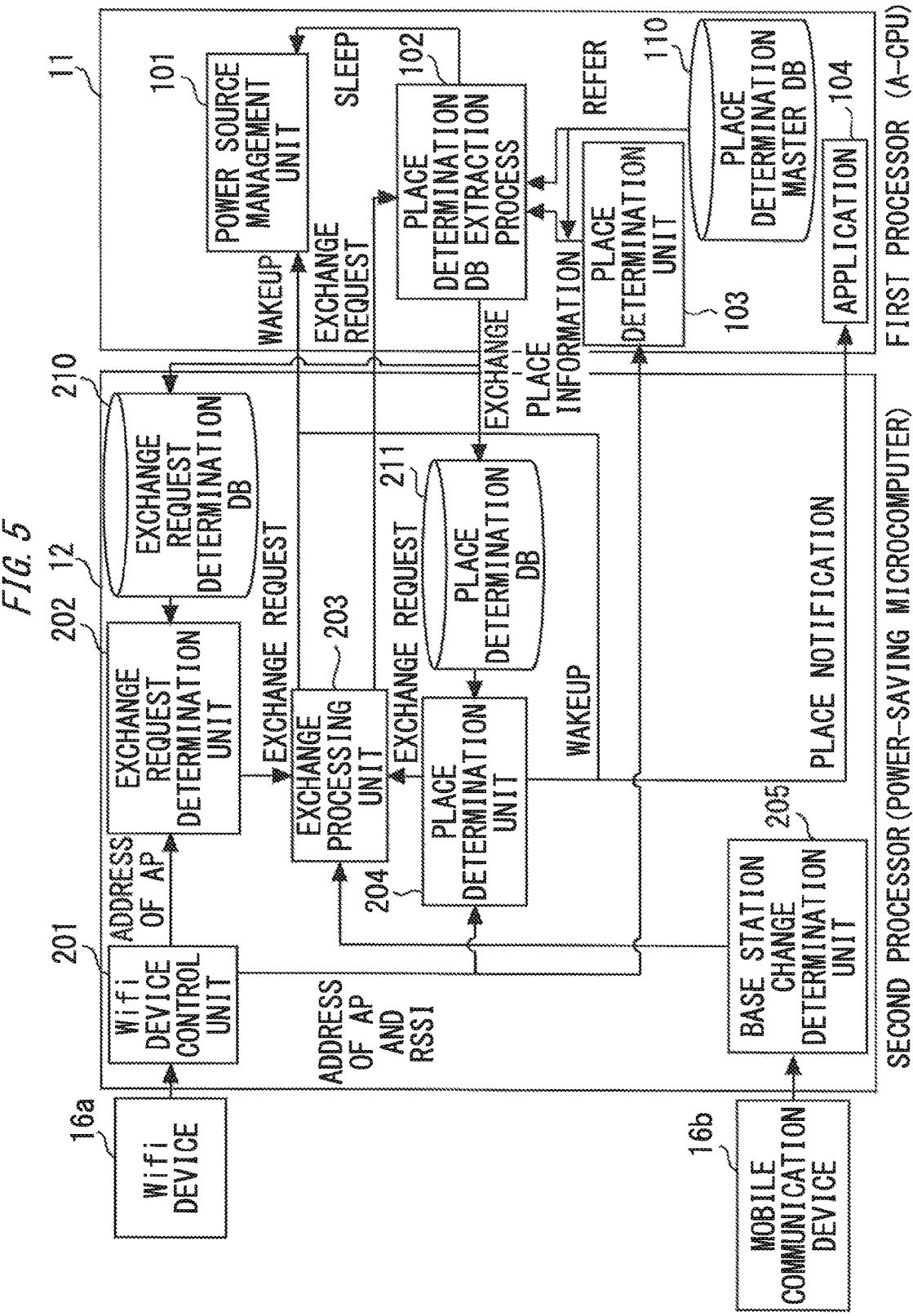
FIG. 5 is a diagram explaining a processing configuration of the information processing apparatus of the present embodiment.

The CPU 11 (application CPU) of the information processing apparatus 10 reads and executes the OS, various programs, and various data stored in the storage unit 13 to execute target programs to implement processing means illustrated in FIG. 5, for example. Along with the execution of the target programs, the CPU 11 of the information processing apparatus 10 implements a power source management unit 101, a place determination DB extraction processing unit 102, a place determination unit 103, and an application 104 illustrated in FIG. 5. However, a hardware circuit may operate one or some of the processing means (the power source management unit 101, the place determination DB extraction processing unit 102, the place determination unit 103, and the application 104) illustrated in FIG. 5. The information processing apparatus 10 includes, for example, a place determination master DB 110 in the storage unit 13 as a storage location of data referenced or managed by the processing means.

The power-saving microcomputer 12 of the information processing apparatus 10 reads and executes various programs and various data stored in the built-in memory to execute target programs and to implement the processing means illustrated in FIG. 5, for example. Along with the execution of the target programs, the power-saving microcomputer 12 of the information processing apparatus 10 implements a Wifi device control unit 201, an exchange request determination unit 202, an exchange processing unit 203, a place determination unit 204, and a base station change determination unit 205 illustrated in FIG. 5. However, a hardware circuit may operate one or some of the processing means (the Wifi device control unit 201, the exchange request determination unit 202, the exchange processing unit 203, the place determination unit 204, and the base station change determination unit 205) illustrated in FIG. 5. The power-saving microcomputer 12 of the information processing apparatus 10 includes, for example, an exchange request determination DB 210 and a place determination DB 211 in the built-in memory 21 as storage locations of data referenced or managed by the processing means.

[Processing Block Configuration]

FIG. 5 illustrates an explanatory view of processing blocks in the information processing apparatus 10 of the present embodiment. In the explanatory view illustrated in FIG. 5, the information processing apparatus 10 includes processing means (the power source management unit 101, the place determination DB extraction processing unit 102, the place determination unit 103, and the application 104) executed by the A-CPU 11 that is the first processor. The A-CPU 11 of the information processing apparatus 10 includes, for example, the place determination master DB 110 in the storage unit 13 as a storage location of data referenced or managed by the processing means.

In the explanatory view illustrated in FIG. 5, the information processing apparatus 10 includes processing means (the Wifi device control unit 201, the exchange request determination unit 202, the exchange processing unit 203, the place determination unit 204, and the base station change determination unit 205) executed by the power-saving microcomputer 12 that is the second processor. The power-saving microcomputer 12 of the information processing apparatus 10 includes, for example, the exchange request determination DB 210 and the place determination DB 211 in the built-in memory 21 as storage locations of data referenced or managed by the processing means. In the following description, the communication standard of the wireless LAN is Wi-Fi.

[Power-Saving Microcomputer: Second Processor]

The Wifi device control unit 201 illustrated in FIG. 5 controls the Wifi device 16a that is a wireless device connected to the power-saving microcomputer 12 and scans the beacon signal that is a radio wave transmitted by each AP, for example. The beacon signal transmitted by each AP includes information, such as SSID of the AP and MAC address (BSSID). The scan of the beacon signal executed by the Wifi device control unit 201 is repeatedly performed at a certain periodic interval of 50 ms or the like, for example. As a result of the scan of the beacon signal, the Wifi device control unit 201 acquires the identification information of each AP according to the location of the information processing apparatus 10, for example. The Wifi device control unit 201 also detects the received signal strength (RSSI) of the beacon signal of each AP according to the location of the information processing apparatus 10, for example.

Although the identification information of AP detected by the Wifi device control unit 201 is BSSID (also called "address") in the following description, the identification information of AP may be, for example, SSID or ESSID. When the SSID or the ESSID is used as the identification information of AP, information corresponding to the attributes of the identification information can be stored in the exchange request determination DB 210.

The Wifi device control unit 201 generates, for example, an address information list based on the identification information of each AP acquired according to the location of the information processing apparatus 10 and notifies the exchange request determination unit 202 of the generated address information list. The Wifi device control unit 201 also generates, for example, scan data by associating the identification information of each AP acquired according to the location of the information processing apparatus 10 and the RSSI detected for each AP with the identification information of the AP and notifies the place determination unit 204 of the generated scan data.

FIGS. 6A(1) and 6A(2) illustrate an example of the scan data and the address information list generated by the Wifi device control unit 201. The scan data illustrated in FIG. 6A(1) includes, for example, records of the radio field strength (RSSI) of each AP detected at the location of the information processing apparatus 10. The records of the scan data illustrated in FIG. 6A(1) include an "address" column indicating the identification information of AP and a "radio field strength" column indicating the radio field strength detected for the AP. The BSSID acquired from the beacon signal transmitted by each AP is stored as identification information in the "address" column. The reception strength of the beacon signal detected for the AP is stored in the "radio field strength" column.

In the example of FIG. 6A(1), three APs with BSSIDs of "12:34:56:78:90:AB", "12:34:56:78:90:AC", and "12:34:56:78:90:AD" are stored at the location of the information processing apparatus 10. For the radio field strength of each AP, radio field strengths "−50" dbm, "−30" dbm, and "−70" dbm detected at the location of the information processing apparatus 10 are stored.

The address information list illustrated in FIG. 6A(2) includes, for example, records of the identification information of each AP detected at the location of the information processing apparatus 10. The records of the address information list illustrated in FIG. 6A(2) includes an "address" column indicating the identification information of AP, and the BSSID acquired from the beacon signal transmitted by the AP is stored as identification information. In the example of FIG. 6A(2), the BSSID of each AP of the scan data illustrated in FIG. 6A(1) is stored as record information.

There is a case in which the data of the exchange request determination DB 210 and the place determination DB 211 held in the built-in memory of the power-saving microcomputer 12 is not confirmed, such as at the power activation of the information processing apparatus 10. To handle the case, the Wifi device control unit 201 in the information processing apparatus 10 at the power activation notifies the place determination unit 103 of the A-CPU 11 that is the first processor of the scan data generated according to the location of the information processing apparatus 10, for example.

In the place determination unit 103 of the A-CPU 11, a place determination process for the location of the information processing apparatus 10 at the power activation is executed based on, for example, the scan data notified from the Wifi device control unit 201. In the A-CPU 11, initial data to be stored in the exchange request determination DB 210 and the place determination DB 211 is generated based on, for example, the "place" information determined by the place determination unit 103. The initial data generated by the A-CPU 11 is stored in, for example, the exchange request determination DB 210 and the place determination DB 211 of the built-in memory 21 of the power-saving microcomputer 12, and the place determination process and the exchange request determination process are started based on the initial data stored in the DBs.

The exchange request determination unit 202 determines an exchange request of the data stored in the exchange request determination DB 210 and the place determination DB 211 based on, for example, the identification information of each AP stored in the address information list notified from the Wifi device control unit 201. The determination of the exchange request is performed by, for example, collating the identification information of each AP at the location of the information processing apparatus 10 notified from the Wifi device control unit 201 with the identification information of AP that is partial information of the place determination information of a predetermined area stored in the exchange request determination DB 210. In the following description, the partial information of the place determination information is described as the identification information of AP included in the place determination information.

If the identification information of each AP notified from the Wifi device control unit 201 is included in the identification information of AP of the predetermined area stored in the exchange request determination DB 210, the exchange request determination unit 202 drives the exchange processing unit 203 and notifies an exchange request, for example. The exchange request includes, for example, the identification information of AP coinciding with the identification information of AP of the predetermined area stored in the exchange request determination DB 210 among the identification information of AP notified from the Wifi device control unit 201.

On the other hand, if the identification information of each AP notified from the Wifi device control unit 201 is not included in the identification information of AP of the predetermined area stored in the exchange request determination DB 210, the exchange request determination unit 202 drives the place determination unit 204 and notifies the start of the place determination process, for example.

The exchange request determination unit 202 may notify the base station change determination unit 205 of the start of the process if the identification information of each AP notified from the Wifi device control unit 201 is not included in the identification information of AP of the predetermined area of the exchange request determination DB 210, for example.

For example, the exchange request determination unit 202 can receive a notification of the release of the memory area of the place determination DB 211 and notify the base station change determination unit 205 of the start of the process if the identification information of each AP detected at the location is not included in the exchange request determination DB 210. The base station change determination unit 205 receives the notification of the exchange request determination unit 202 and determines a change in a base station ID of an active cell for receiving a call, for example.

The exchange processing unit 203 issues a start request to the power source management unit 101 of the A-CPU 11 as a result of, for example, the notification of an exchange request of the exchange request determination unit 202, the place determination unit 204, or the base station change determination unit 205. The start request issued by the exchange processing unit 203 is received as, for example, an interrupt request for the power source management unit 101 of the A-CPU 11. The power source management unit 101 of the A-CPU 11 restores the A-CPU 11 from the sleep state as a result of, for example, the reception of the interrupt request.

The exchange processing unit 203 issues the exchange request of the data held in the exchange request determination DB 210 and the place determination DB 211 to the A-CPU 11 returned from the sleep state, for example. The place determination DB extraction processing unit 102 of the A-CPU 11 receives the exchange request issued by the exchange processing unit 203, for example.

When the notification of the exchange request from the exchange request determination unit 202 is received, the exchange processing unit 203 includes the identification information of AP notified from the exchange request determination unit 202 in the exchange request for the place determination DB extraction processing unit 102 of the A-CPU 11 and transfers the exchange request, for example. When the notification of the exchange request from the base station change determination unit 205 is received, the exchange processing unit 203 includes the base station ID information notified from the base station change determination unit 205 in the exchange request for the place determination DB extraction processing unit 102 of the A-CPU 11 and transfers the exchange request.

When the notification of the exchange request from the place determination unit 204 is received for example, the exchange processing unit 203 deletes the data of the place determination DB 211 for example. The exchange processing unit 203 suppresses the drive of the place determination process by the place determination unit 204 and releases the memory area used in the place determination DB 211, for example. The released memory area is used as, for example, a data area of the exchange request determination DB 210. The exchange processing unit 203 notifies the exchange request determination unit 202 of the release of the memory area of the place determination DB 211, for example.

After the expansion of the data area of the exchange request determination DB 210, the exchange processing unit 203 notifies the place determination DB extraction processing unit 102 of the A-CPU 11 of an exchange request of the data of the exchange request determination DB 210, without adding other information.

The exchange processing unit 203 receives the exchange data of the place determination DB 210 and the exchange request determination DB 211 from the A-CPU 11 and rewrites the data held in the DBs, for example. The exchange processing unit 203 also receives the initial data of the place determination DB 210 and the exchange request determination DB 211 from the A-CPU 11 at the power activation and sets the received initial data in the DBs, for example.

When the rewriting of the data held in each DB is completed or when the setting of the initial data in each DB is completed, the exchange processing unit 203 notifies the exchange request determination unit 202 and the place determination unit 204 of a start request of the place determination process, for example. When the rewriting of the data held in each DB is completed or when the setting of the initial data in each DB is completed, the exchange processing unit 203 also notifies the A-CPU 11 of the completion of the rewriting of the data and the completion of the setting of the initial data.

The place determination unit 204 collates the scan data notified from the Wifi device control unit 201 with the place determination information of the area range held in the place determination DB 211 to estimate the "place" of the location of the information processing apparatus 10, for example.

For example, it is assumed that histogram data illustrated in FIG. 6B is held as the place determination information in the place determination DB 211. The histogram data illustrated in FIG. 6B is, for example, the same data as the place determination information including the records of "place L1" and "place L2" illustrated in FIG. 1D. The records of "place L1" and "place L2" illustrated in FIG. 6B are described in FIG. 1D. For the likelihood information associated with the histogram data, the likelihood can be obtained in advance based on the histogram data of the RSSI detected in an experiment, for example. The identification information of each AP detected at the location of the information processing apparatus 10 and the scan data generated based on the RSSI of each AP are the scan data illustrated in FIG. 6A(1).

The place determination unit 204 calculates the likelihood of each "place" from, for example, the RSSI of each AP of the scan data and the likelihood associated with each bin of the RSSI of the histogram data of each "place" held in the place determination DB 211. The place determination unit 204 compares the size of the calculated value of the likelihood of each "place" and a threshold to determine the "place" of the location at which the scan data is detected, for example. The likelihood of each "place" can be expressed by a product of the likelihoods associated with the bins indicating the strength sections of the RSSI of each AP detected in the scan data, for example.

For example, in the scan data of FIG. 6A(1), the RSSI of the AP "12:34:56:78:90:AB" is "−50" dbm, the RSSI of the AP "12:34:56:78:90:AC" is "−70" dbm, and the RSSI of the AP "12:34:56:78:90:AD" is "−30" dbm. In the histogram data of the "place L1" illustrated in FIG. 6B, the RSSI "−50" dbm of "12:34:56:78:90:AB(=a1)" is equivalent to the bin of "−40 to −60", and the likelihood associated with the bin is "0.25". Similarly, in the histogram data of the "place L1", the RSSI "−70" dbm of "12:34:56:78:90:AC(=a2)" is equivalent to the bin of "−60 to −80", and the likelihood associated with the bin is "0.1". In the histogram data of the "place L1", the RSSI "−30" dbm of "12:34:56:78:90:AD(=a3)" is equivalent to the bin of "−40 or more", and the likelihood associated with the bin is "0.05".

In the histogram data of the "place L2" illustrated in FIG. 6B, the RSSI "−50" dbm of "12:34:56:78:90:AB(=a1)" is equivalent to the bin of "−40 to −60", and the likelihood associated with the bin is "0.2". Similarly, in the histogram data of the "place L2", the RSSI "−70" dbm of "12:34:56:78:90:AC(=a2)" is equivalent to the bin of "−60 to −80", and the likelihood associated with the bin is "0.75". In the histogram data of the "place L2", the RSSI "−30" dbm of "12:34:56:78:90:AD(=a3)" is equivalent to the bin of "−40 or more", and the likelihood associated with the bin is "0.8".

For the scan data illustrated in FIG. 6A, the likelihoods of the "place L1" and the "place L2" based on the histogram data illustrated in FIG. 6B are calculated as follows. The likelihoods of the "place L1" and the "place L2" are expressed as, for example, "p (place L1|scan data)" and "p (place L2|scan data)", respectively.

$$p \text{ (place } L1|\text{scan data)} = p((AP=a1,RSSI=-50)|L1) \times p((AP=a2,RSSI=-70|L1) \times p((AP=a3,RSSI=-30)|L1) = (0.25) \times (0.1) \times (0.05) = 0.00125$$

$$p \text{ (place } L2|\text{scan data)} = p((AP=a1,RSSI=-50)|L2) \times p((AP=a2,RSSI=-70|L2) \times p((AP=a3,RSSI=-30)|L2)$$

$$=(0.6) \times (0.75) \times (0.8) = 0.36 \quad \text{Calculation Example 1}$$

When the likelihoods of each "place" calculated in the "place L1" and the "place L2" are compared, the likelihood is relatively the largest in the "place L2". Here, when the threshold for estimating the "place" is "0.10", the size relationship is (place L1: 0.00125)<0.10<(place L2: 0.36). Since the likelihood of the "place L2" is the largest of the "place L1" and the "place L2" and exceeds the threshold, it is determined that the location of the information processing apparatus 10 that has detected the scan data is the "place L2".

Calculation Example 2

Figures 6C, 6D:
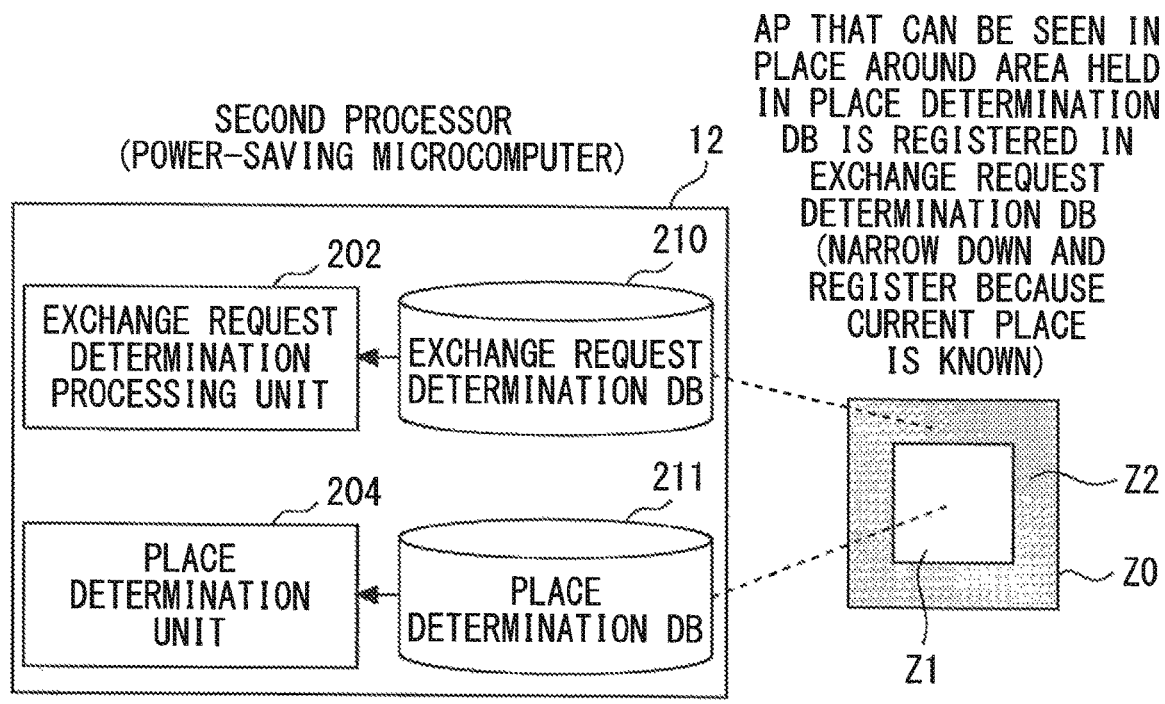
FIG. 6C depicts an example of the scan data.
FIG. 6D is an explanatory view explaining an area range of the place determination information and an area range of partial information of the place determination information.

Next, a calculation example of scan data illustrated in FIG. 6C will be described. FIG. 6C indicates scan data of a case in which part of the APs defined in the histogram data illustrated in FIG. 6B is not detected, for example. In the scan data of FIG. 6C, the RSSI of the AP "12:34:56:78:90:AB(=a1)" is detected at "−30" dbm, and the RSSI of the AP "12:34:56:78:90:AD(=a3)" is detected at "−70" dbm, for example. The RSSI for the AP "12:34:56:78:90:AC(=a2)" is not detected.

In the histogram data of the "place L1" illustrated in FIG. 6B, the RSSI "−30" dbm of "12:34:56:78:90:AB(=a1)" is equivalent to the bin of "−40 or more", and the likelihood associated with the bin is "0.6". Similarly, in the histogram data of the "place L1", the undetected RSSI of "12:34:56:78:90:AC(=a2)" is equivalent to the bin of "not detected", and the likelihood associated with the bin is "0.9". In the histogram data of the "place L1", the RSSI "−70" dbm of "12:34:56:78:90:AD(=a3)" is equivalent to the bin of "−60 to 80", and the likelihood associated with the bin is "0.85".

In the histogram data of the "place L2" illustrated in FIG. 6B, the RSSI "−30" dbm of "12:34:56:78:90:AB(=a1)" is equivalent to the bin of "−40 or more", and the likelihood associated with the bin is "0.2". Similarly, in the histogram data of the "place L2", the undetected RSSI of "12:34:56:78:90:AC(=a2)" is equivalent to the bin of "not detected", and the likelihood associated with the bin is "0.1". In the histogram data of the "place L2", the RSSI "−70" dbm of "12:34:56:78:90:AD(=a3)" is equivalent to the bin of "−60 to 80", and the likelihood associated with the bin is "0.05".

For the scan data illustrated in FIG. 6C, the likelihoods of the "place L1" and the "place L2" based on the histogram data illustrated in FIG. 6B are calculated as follows. The expression of the likelihoods of the "place L1" and the "place L2" is the same as in Calculation Example 1.

$$(\text{place } L1|\text{scan data}) = p((AP=a1,RSSI=-30)|L1) \times p((AP=a2,RSSI=\text{not detected }|L1) \times p((AP=a3,RSSI=-70)|L1)$$

$$=(0.6) \times (0.9) \times (0.85) = 0.459$$

$$p(\text{place } L2|\text{scan data}) = p((AP=a1,RSSI=-30)|L2) \times p((AP=a2,RSSI=\text{not detected }|L2) \times p((AP=a3,RSSI=-70)|L2)$$

$$=(0.2) \times (0.1) \times (0.05) = 0.0001$$

When the likelihoods of each "place" calculated in the "place L1" and the "place L2" are compared, the likelihood is relatively the largest in the "place L1". Here, when the threshold for estimating the "place" is "0.10", the size relationship is (place L1: 0.459)>0.10>(place L2: 0.0001). Since the likelihood of the "place L1" is the largest of the "place L1" and the "place L2" and exceeds the threshold, it is determined that the location of the information processing apparatus 10 that has detected the scan data is the "place L1".

If the largest likelihood for the estimated "place" is smaller than the threshold when the location is estimated based on the place determination information of the area range held in the place determination DB 211, the place determination unit 204 determines that the position is in an area in which the place is not defined, for example.

For example, when the AP of the wireless LAN is not provided in the area A2 illustrated in FIG. 3A, the information processing apparatus 10 does not detect a receivable beacon signal. When the place determination information is not registered in the place determination master DB 110, the detected identification information of the AP is not included in the place determination DB 211 even if the information processing apparatus 10 detects a receivable beacon signal of the AP. Therefore, in the area A2 illustrated in FIG. 3A, the likelihood of each "place" is calculated by using, for example, the likelihood associated with the bin of the RSSI "not detected" in each "place" held in the place determination DB 211.

For example, the likelihoods of "not detected" of each AP in the "place L1" are "0.05", "0.9", and "0.05" in the example of FIG. 6B, and the likelihood of the "place L1" is calculated to be "0.00225". The likelihoods of "not detected" of each AP in the "place L2" are "0.1", "0.1", and "0.05", and the likelihood of the "place L2" is calculated to be "0.0005". The likelihoods of each "place" calculated in the "place L1" and the "place L2" are compared, and the likelihood is relatively the largest in the "place L1". However, when the threshold for estimating the "place" is "0.10", the size relationship is 0.01>(place L1: 0.00225)>(place L2: 0.0005). Therefore, the place determination unit 204 in the area A2 illustrated in FIG. 3A determines that the position is in an area in which the place is not defined.

If the place determination unit 204 determines that the position is in an area in which the place is not defined as a result of the place determination process, the place determination unit 204 notifies the exchange processing unit 203 of an exchange request for the identification information of AP of a predetermined area held in the exchange request determination DB 210, for example.

Returning to the explanatory view illustrated in FIG. 5, if it is estimated that the "place" is associated with the automatic execution of the application as a result of the place determination process, the place determination unit 204 issues a start request to the power source management unit 101 of the A-CPU 11, for example. The start request issued by the place determination unit 204 is received as, for example, an interrupt request for the power source management unit 101 of the A-CPU 11. In the power source management unit 101 of the A-CPU 11, the A-CPU 11 is restored from the sleep state as a result of the reception of the interrupt request, for example.

The place determination unit 204 notifies the application 104 of the A-CPU 11 returned from the sleep state of the "place" estimated as a result of the place determination process, for example. In the application 104 of the A-CPU 11, the application associated with the "place" is executed based on the "place" notified from the place determination unit 204. As a result of the execution of the application, coupons usable in a store or the like are automatically displayed on the display screen, such as the LCD 15a, of the information processing apparatus 10, for example.

The base station change determination unit 205 controls the mobile communication device 16b connected to the power-saving microcomputer 12 and performs a cell search based on notification information from a communication base station connected to a mobile phone network or the like, for example. As a result of the cell search, the base station change determination unit 205 acquires base station ID information including a base station ID of an active cell that receives a paging channel for receiving a call, at the location of the information processing apparatus 10, for example. The base station ID information includes, for example, the base station ID or the like around the active cell.

The base station change determination unit 205 compares the base station ID of the active cell acquired most recently and the base station ID of the active cell acquired at the location after the movement and determines a change in the base station ID of the active cell, for example. When a change in the acquired base station ID is detected, the base station change determination unit 205 notifies the exchange processing unit 203 of an exchange request of the data held in the exchange request determination DB 210, for example. The base station ID information including the base station ID after the change is added to the notification of the exchange request for the exchange processing unit 203.

The base station change determination unit 205 may determine the change in the base station ID of the active cell based on, for example, the result of the determination of the exchange request determination unit 202. For example, the process of the base station change determination unit 205 may be executed when the data held in the exchange request determination DB 210 does not include the identification information of each AP notified from the Wifi device control unit 201.

[A-CPU: First Processor]

In the explanatory view illustrated in FIG. 5, the power source management unit 101 executes a power source management process of the A-CPU 11 based on, for example, the start request from the power-saving microcomputer 12 that is the second processor or the interrupt request of the place determination DB extraction processing unit 102. The power source management unit 101 receives the start request from the power-saving microcomputer 12 as an interrupt request of the power source management process, for example. The power source management unit 101 starts the A-CPU 11 as a result of, for example, the reception of the interrupt request from the power-saving microcomputer 12 and returns from the sleep state. The start request from the power-saving microcomputer 12 includes the start request issued by the exchange processing unit 203 and the place determination unit 204, for example. In the A-CPU 11 that is the second processor returned from the sleep state, the place determination DB extraction process unit 102, the place determination unit 103, and the application 104 are operated, for example.

The power source management unit 101 shifts the A-CPU 11 that is the first process to the sleep state as a result of, for example, the reception of the interrupt request issued by the place determination DB extraction processing unit 102. The power consumption of the A-CPU 11 is reduced in the A-CPU 11 in the sleep state, and the total power consumption of the information processing apparatus 10 can be reduced.

The place determination DB extraction processing unit 102 extracts the data regarding the exchange of the exchange request determination DB 210 and the place determination DB 211 from the place determination master DB 110 based on, for example, the exchange request issued by the power-saving microcomputer 12. The place determination DB extraction processing unit 102 generates exchange data of the exchange request determination DB 210 and the place determination DB 211 in response to the exchange request based on, for example, the data extracted from the place determination master DB 110.

At the power activation or the like of the information processing apparatus 10, the place determination DB extraction processing unit 102 extracts the data regarding the initial data of the exchange request determination DB 210 and the place determination DB 211 from the place determination master DB 110 based on, for example, the "place" information determined by the place determination unit 103. The place determination DB extraction processing unit 102 generates the initial data of the exchange request determination DB 210 and the place determination DB 211 based on, for example, the data extracted from the place determination master DB 110.

The place determination DB extraction processing unit 102 issues the interrupt request for the power source management unit 101 after the completion of rewriting of the exchange request determination DB 210 and the place determination DB 211 based on the generated exchange data and initial data, for example. The power source management unit 102 shifts the A-CPU 11 that is the first processor to the sleep state as a result of, for example, the reception of the interrupt request issued from the place determination DB extraction processing unit 102.

The place determination DB extraction processing unit 102 searches the place determination master DB 110 based on, for example, the identification information of AP included in the notification of the exchange request issued by the power-saving microcomputer 12 that is the second processor and specifies the "place" corresponding to the identification information of AP. The place determination DB extraction processing unit 102 extracts place determination information of a predetermined area (for example, area Z1 illustrated in FIG. 6D) and partial information of the place determination information of a predetermined area (for example, area Z2 illustrated in FIG. 6D) from the place determination master DB 110 based on the specified "place". In the following description, the partial information of the place determination information will be described as the identification information of AP included in the place determination information.

FIG. 6D illustrates an explanatory view of a range area of the place determination information and a range area regarding the identification information of AP extracted from the place determination master DB 110. In the explanatory view of FIG. 6D, the area Z1 indicates an area range of the place determination information held in the place determination DB 211 after the data exchange, and the area Z2 indicates an area range of the identification information of AP that is the partial information of the place determination information held in the exchange request determination DB 210 after the data exchange, for example. An area Z0 indicates the place determination information of the predetermined area extracted from the place determination master DB 110, for example.

The place determination information in the area Z1 includes, for example, the "place" including the histogram of the RSSI including the identification information of AP notified from the power-saving microcomputer 12. The place determination DB extraction processing unit 102 extracts the area Z1, in which the notified identification information of AP is included in the place determination information, from the place determination master DB 110 according to, for example, the storage capacity of the place determination DB 211. The place determination DB extraction processing unit 102 handles the area Z1 as a center area and extracts, as the area Z2, the place determination information associated with the "place" of the peripheral area adjacent to the area range of the area Z1, for example. The place determination information of the area Z2 includes, for example, the identification information of another AP different from the identification information of the AP notified from the power-saving microcomputer 12.

The identification information of AP held in the exchange request determination DB 210 is partial information included in the place determination information associated with the "place". Therefore, the place determination DB extraction processing unit 102 extracts the place determination information of the area Z2 based on, for example, the unit capacity of the partial information, such as the identification information of AP or the like, and the storage capacity of the exchange request determination DB 210 that holds the partial information. However, the place determination DB extraction processing unit 102 may set the area range of the area Z1 and the area range of the area Z2 based on the notified identification information of AP and extract the area Z0 including the area ranges from the place determination master DB 110, for example.

For example, it is assumed that in the range of the rectangular areas depicted in the example of FIG. 2B(1), the rectangular areas A22 to A24, A32 to A34, and A42 to A44 correspond to the area Z1 in which the notified identification information of AP is included in the place information. In this case, the area Z1 serves as the center area, and the area Z2 corresponds to the peripheral area surrounding the area Z1, for example. In the example of FIG. 2B(1), the area Z2 can be illustrated as a peripheral area of the range of the "place" surrounding the rectangular areas corresponding to the area Z1 and adjacent to the area Z1, such as the rectangular areas A11 to A15, A21, A25, A31, A35, A41, A45, and A51 to A55, for example. In the example of FIG. 2B(1), the area Z0 corresponds to a range area including the areas Z1 and Z2, such as the rectangular areas A11 to A15, A21 to A25, A31 to A35, A41 to A45, and A51 to A55, for example.

The place determination DB extraction processing unit 102 extracts the place determination information corresponding to each of the rectangular areas A22 to A24, A32 to A34, and A42 to A44 of FIG. 2B(1) from the place determination master DB 110, for example. The place determination DB extraction processing unit 102 generates exchange data for exchanging the place determination DB 211 of the power-saving microcomputer 12 from the place determination information extracted from the place determination master DB 110, for example. The generated exchange data of the place determination DB 211 corresponds to, for example, the place determination information of the area Z1 illustrated in FIG. 6D.

The place determination DB extraction processing unit 102 extracts the place determination information corresponding to each of the rectangular areas A11 to A15, A21, A25, A31, A35, A41, A45, and A51 to A55 of FIG. 2B(1) from the place determination master DB 110, for example. The place determination DB extraction processing unit 102 further extracts the identification information of AP, which is the partial information, from the place determination information extracted from the place determination master DB 110 to generate exchange data for exchanging the exchange request determination DB 210 of the power-saving microcomputer 12, for example. The generated exchange data of the exchange request determination DB 210 corresponds to, for example, the identification information of AP of the area Z2 illustrated in FIG. 6D.

The place determination DB extraction processing unit 102 temporarily stores the generated exchange data of the exchange request determination DB 210 and the place determination DB 211 in a predetermined area of the storage unit 13b, for example. The data of the exchange request determination DB 210 and the place determination DB 211 of the power-saving microcomputer 12 is rewritten by the exchange data corresponding to each DB.

For example, the place determination DB extraction processing unit 102 illustrated in FIG. 5 transmits the place determination information of the area Z1 and the identification information of AP of the area Z2, which are the generated exchange data, to the exchange processing unit 203 of the power-saving microcomputer 12. In the exchange processing unit 203 of the power-saving microcomputer 12, the data of the place determination DB 211 is rewritten based on the place determination information of the area Z1, and the data of the exchange request determination DB 210 is rewritten based on the identification information of AP that is the partial information of the place determination information of the area Z2, for example.

The rewriting of the data of the exchange request determination DB 210 and the place determination DB 211 may be executed by, for example, the place determination DB extraction processing unit 102. For example, the place determination DB extraction processing unit 102 may access the storage area of the built-in memory of the power-saving microcomputer 12 and rewrite the data of the storage area allocated to the exchange request determination DB 210 and the place determination DB 211.

The place determination DB extraction processing unit 102 issues an interrupt request to the power source management unit 101 as a result of, for example, the completion of the rewriting of the data of the place determination DB 211 and the exchange request determination DB 210 of the power-saving microcomputer 12 and shifts the state of the A-CPU 11 to the sleep state. In the A-CPU 11 shifted to the sleep state as a result of the completion of the rewriting of the data of the place determination DB 211 and the exchange request determination DB 210, the power consumption of the A-CPU 11 is reduced in a period before the next start request is issued. In the information processing apparatus 10 in which the A-CPU 11 is shifted to the sleep state, the power-saving microcomputer 12 continuously executes the scan control regarding the place detection and the place determination process, and the total power consumption of the information processing apparatus 10 is reduced.

When the notification of the exchange request does not include additional information, the place determination DB extraction processing unit 102 illustrated in FIG. 5 extracts the area range of the exchange data of the exchange request determination DB 210 from the place determination information registered in the place determination master DB 110, for example. As described in the exchange processing unit 203 of FIG. 5, the notification of the exchange request not including the additional information is issued when, for example, it is determined in the place determination process of the power-saving microcomputer 12 that the position is not in any of the places held in the place determination DB 211.

When the notification of the exchange request does not include the additional information, the place determination DB extraction processing unit 102 extracts the area range of the exchange data of the exchange request determination DB 210 based on, for example, the information of the areas Z1 and Z2 generated most recently.

Figure 6E:
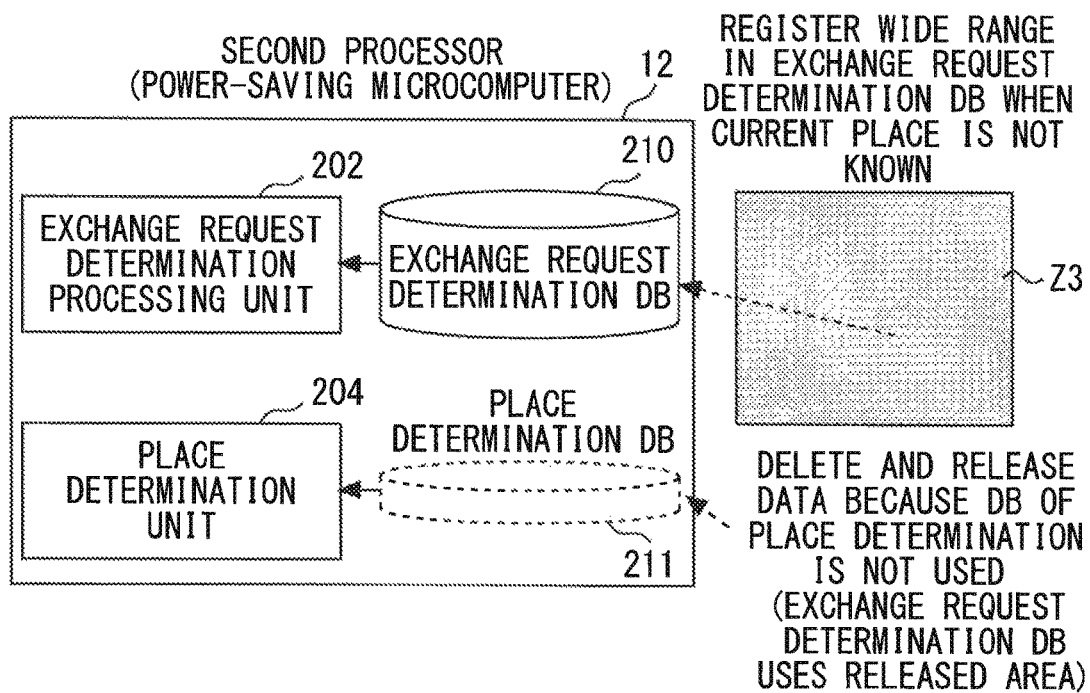
FIG. 6E is an explanatory view explaining an area range of exchange data of an exchange request determination DB.

FIG. 6E illustrates an explanatory view of the area range of the exchange data of the exchange request determination DB 210 extracted from the place determination master DB 110. In the explanatory view of FIG. 6E, an area Z3 indicates, for example, an area range of the exchange data for the exchange request determination DB 210 extracted when the notification of the exchange request issued by the power-saving microcomputer 12 does not include the additional information.

The area range of the area Z3 illustrated in FIG. 6E is equivalent to, for example, an area range of the usable storage area of the exchange request determination DB 210 expanded based on the released memory area after the release of the memory area allocated to the place determination DB 211. In the place determination DB extraction processing unit 102, the exchange data indicated by the area Z3 is extracted based on, for example, the capacity of the partial information in the place determination information and the capacity of the storage area after the expansion, held in the exchange request determination DB 210. The storage capacity of the exchange request determination DB 210 with the expanded memory area is set in advance based on, for example, the storage capacity of the built-in memory 21 of the power-saving microcomputer 12.

When the notification of the exchange request does not include the additional information, the place determination DB extraction processing unit 102 extracts, as the exchange data, the place determination information of the area Z3 which is the partial information equivalent to the preset storage capacity of the exchange request determination DB 210 after the expansion of the memory area, for example. The place determination information of the area Z3 as the exchange data is extracted from the place determination master DB 110.

The place determination DB extraction processing unit 102 extracts the partial information, such as the identification information of AP, from the place determination information of the area Z3 to generate exchange data, for example. The place determination DB extraction processing unit 102 temporarily stores the exchange data generated from the partial information of the place determination information of the area Z3 in a predetermined area of the storage unit 13b, for example. The rewriting of the data of the exchange request determination DB 210 in which the memory area of the power-saving microcomputer 12 is expanded is performed by, for example, the exchange data generated based on the partial information of the place determination information of the area Z3 extracted from the place determination master DB 110.

As a result, the exchange request determination DB 210 with the expanded memory area can hold, as the exchange request determination data, the partial information of the place determination information in a relatively wide range compared to before the release of the memory area of the place determination DB 211, for example.

When the notification of the exchange request does not include the additional information, the place determination DB extraction processing unit 102 handles, as the center area, the place determination information of the area Z1 generated most recently and the partial information of the area Z2 and extracts, as the area Z3, the place determination information that is the peripheral area of the center area, for example. However, the place determination information of the area Z3 extracted from the place determination master DB 110 does not include the place determination information of the area Z1 generated most recently and the partial information of the area Z2.

When the notification of the exchange request includes a base station ID of a communication base station of a mobile phone network or the like, the place determination DB extraction processing unit 102 illustrated in FIG. 5 extracts the place determination information associated with the base station ID as the area Z3, for example. For example, in the place determination information associated with the RSSI of each AP, the "place" and the base station ID can be associated in advance based on the communication possible range (coverage area) provided by the communication base station. The place determination information in which the "place" and the base station ID are associated can be registered in the place determination master DB 110. The place determination DB extraction processing unit 102 can, for example, search the place determination master DB 110 based on the base station ID included in the notification of the exchange request and extract the place determination information of the area Z3 including the place determination information associated with the base station ID.

When the notification of the "place" information determined by the place determination unit 103 is received, the place determination DB extraction processing unit 102 illustrated in FIG. 5 generates initial data of the exchange request determination DB 210 and the place determination DB 211 corresponding to the "place" information, for example. The place determination DB extraction processing unit 102 extracts the place determination information corresponding to the area Z1 and the area Z2 illustrated in FIG. 6D from the place determination master DB 110 based on the "place" information notified from the place determination unit 103, for example. The place determination information of the area Z1 includes the "place" notified from the place determination unit 103. The area Z2 includes the place determination information of the peripheral area adjacent to the area range of the area Z1, in which the area Z1 is the center area.

The place determination DB extraction processing unit 102 generates the initial data of the place determination DB 211 from, for example, the place determination information of the area Z1 extracted from the place determination master DB 110. The place determination DB extraction processing unit 102 extracts the partial information, such as the identification information of AP or the like, from the place determination information of the area Z2 extracted from the place determination master DB 110 to generate the initial data of the exchange request determination DB 210, for example. The generated initial data of each DB is temporarily stored in, for example, a predetermined area of the storage unit 13b.

The place determination DB extraction processing unit 102 transmits the generated initial data of each DB to the exchange processing unit 203 of the power-saving microcomputer 12, for example. In the exchange processing unit 203 of the power-saving microcomputer 12, the received initial data is stored in the exchange request determination DB 210 and the place determination DB 211, and the place determination process and the exchange request determination process are started based on the initial data stored in the DBs, for example.

The place determination unit 103 illustrated in FIG. 5 executes the place determination process based on the scan data notified from the power-saving microcomputer 12 in order to determine the location of the information processing apparatus 10 after the power activation or the like and determines the "place" of the location of the information processing apparatus 10, for example. The "place" information determined by the place determination unit 103 is transmitted to, for example, the place determination DB extraction processing unit 102. The process by the place determination unit 103 is described in the place determination unit 204 illustrated in FIG. 5.

The application 104 illustrated in FIG. 5 executes an application program associated with the "place" based on, for example, the "place" information notified from the place determination unit 204 of the power-saving microcomputer 12. As a result of the execution of the application 104, coupons usable in a store or the like can be automatically displayed on the LCD 15a or the like of the information processing apparatus 10, and services with improved convenience according to the location of the information processing apparatus 10 can be provided, for example.

[Processing Flow]

Hereinafter, the exchange request determination process by the information processing apparatus 10 of the present embodiment based on the identification information of AP that is the partial information of the place determination information will be described with reference to a flow chart illustrated in FIG. 7A. The power-saving microcomputer 12 that is the second processor mainly executes the exchange request determination process illustrated in FIG. 7A.

Figure 7A:
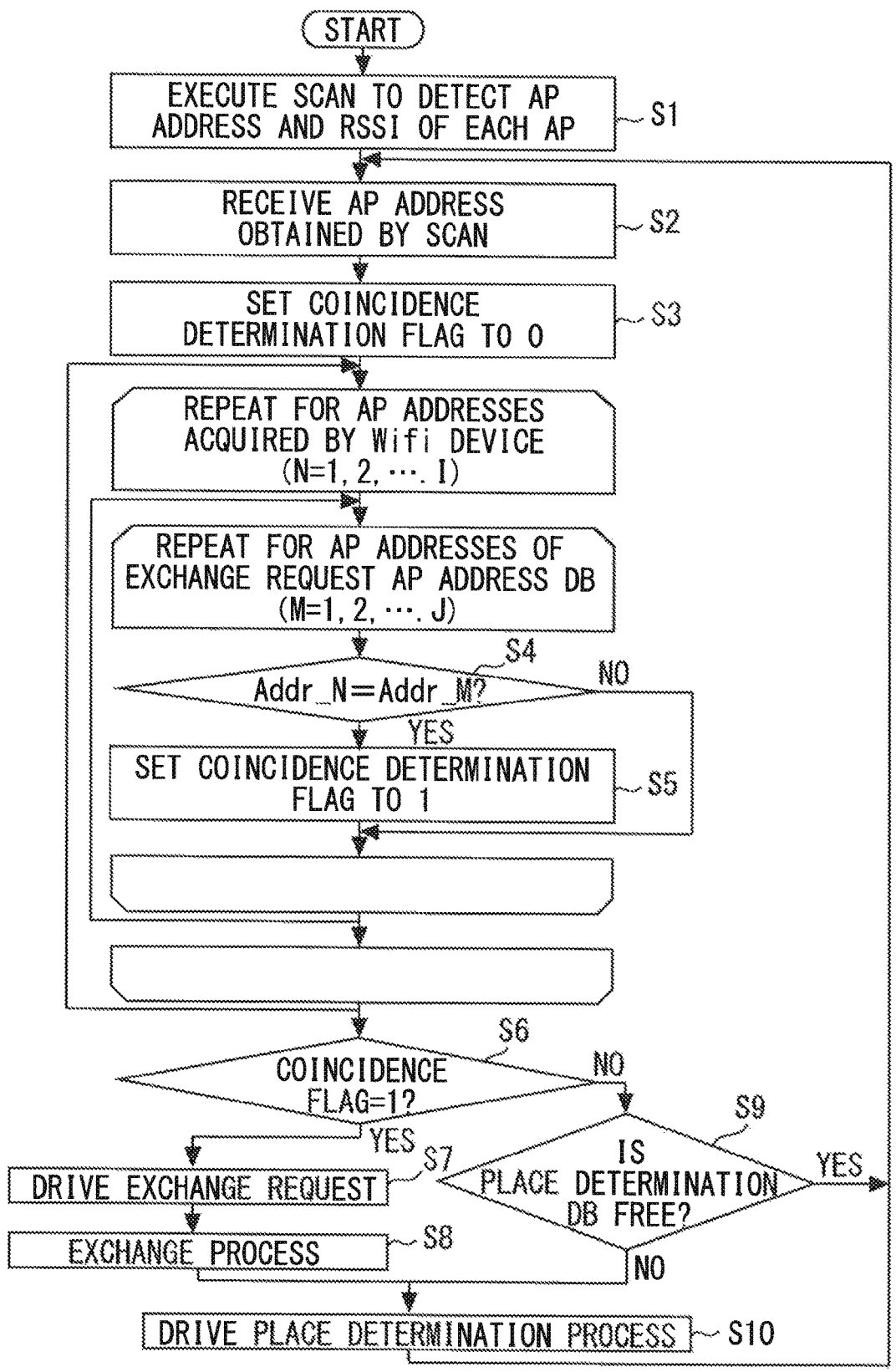
FIG. 7A is a flow chart illustrating an exchange request determination process.

The exchange request determination process illustrated in FIG. 7A is an example of a process in which the BSSID of 6 bytes (48 bits) acquired by the scan of the beacon signal is adopted as the identification information of AP regarding the process, for example. Here, the beacon signal transmitted by each AP includes identification information, such as SSID that is the name for identifying the AP and ESSID for identifying the network that is a wireless network to which the AP belongs. Therefore, the SSID or the ESSID may be used as the identification information of AP regarding the exchange request determination process. When the SSID or the ESSID is used as the identification information of AP, partial information corresponding to attributes of the identification information can be stored in the exchange request determination DB 210.

In the flowchart illustrated in FIG. 7A, the exchange request determination process can be started at the scan of the beacon signal transmitted by each AP, for example. The information processing apparatus 10 controls the wireless device, such as the Wifi device 16a, at the location of the information processing apparatus 10 and scans the beacon signal received at the location, at a certain periodic interval such as 50 ms, for example. As a result of the scan of the beacon signal, the information processing apparatus 10 detects the identification information of each AP (AP address: BSSID) at the location and the received signal strength (RSSI) of each AP (S1).

The information processing apparatus 10 generates an address information list based on, for example, the identification information of each AP detected in the process of S1 and transfers the generated address information list to the process of S2. The information processing apparatus 10 associates the RSSI of each AP detected in the process of S1 with the identification information of the AP to generate the scan data illustrated in FIG. 6A(1), for example. The generated scan data is transferred to, for example, the place determination process.

Figure 7B:
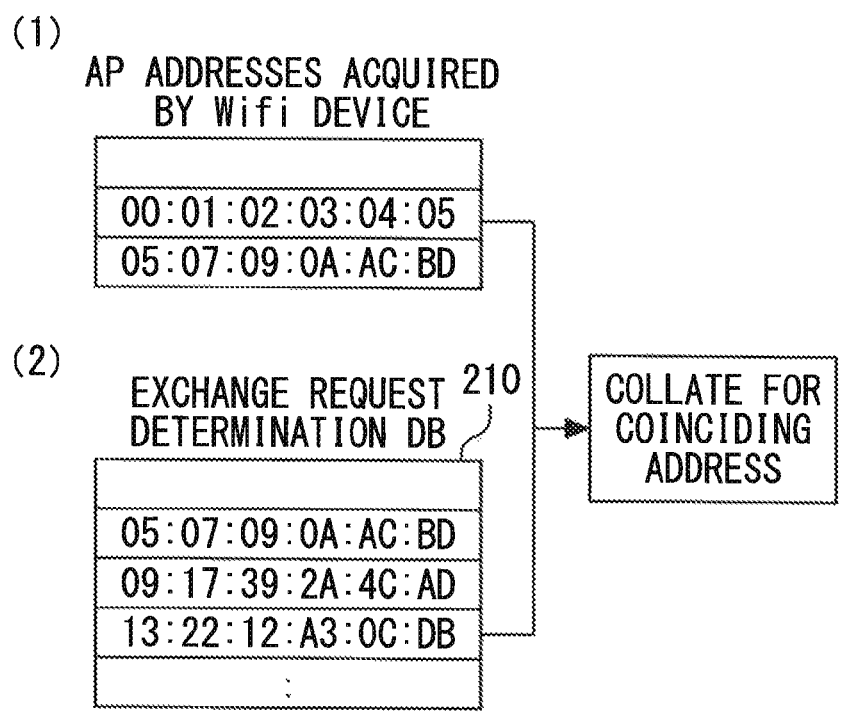
FIG. 7B depicts an example of the address information list and determination data of the exchange request determination DB.

FIG. 7B(1) illustrates an example of the address information list transferred to the process of S2. In the example of FIG. 7B(1), AP addresses (BSSIs) of six bytes, such as "00:01:02:03:04:05" and "05:07:09:0A:AC:BD", are stored as the detected identification information of AP. The information processing apparatus 10 repeatedly executes the processes of S3 to S6 for each AP address illustrated in FIG. 7B(1), for example.

Returning to the flow chart illustrated in FIG. 7A, the information processing apparatus 10 receives the address information list generated based on the identification information of AP detected in the process of S1, for example (S2). The information processing apparatus 10 collates the AP addresses of the received address information list with the determination data, which is stored in the exchange request determination DB 210, for exchanging the exchange request determination DB 210 and the place determination DB 211 (S3 to S6).

The determination data stored in the exchange request determination DB 210 is partial information of the place determination information collated in the place determination process, and the BSSI that is the AP address is adopted as the partial information of the place determination information in the example of the exchange request determination process of FIG. 7A. Therefore, the AP addresses included in the place determination information of the area Z2 and the area Z3 described in FIGS. 6D, 6E, and the like are stored as the determination data in the exchange request determination DB 210, for example.

FIG. 7B(2) illustrates an example of the determination data stored in the exchange request determination DB 210. In the example of FIG. 7B(2), AP addresses of six bytes, such as "05:07:09:0A:AC:BD", "09:17:39:2A:4C:AD", and "13:22:12:A3:0C:DB", are stored. In the processes of S3 to S6, the information processing apparatus 10 collates each AP address received in the process of S2 with the AP addresses stored in the exchange request determination DB 210 to determine the data exchange of the exchange request determination DB 210 and the place determination DB 211, for example.

In the process of S3 illustrated in FIG. 7A, the information processing apparatus 10 sets "0" in a coincidence determination flag indicating that each AP address received in the process of S2 coincides with the AP addresses stored in the exchange request determination DB 210, for example. The coincidence determination flag is set for each AP address received in the process of S2, for example.

In the process of S4, the information processing apparatus 10 determines an AP address to be processed ("Addr_N") among the AP addresses (N=1, 2, . . . , I) received in the process of S2, for example. The information processing apparatus 10 also refers to the exchange request determination DB 210 to extract an AP address to be collated ("Addr_M") among the stored AP addresses (M=1, 2, . . . , J). The information processing apparatus 10 collates the AP address to be processed ("Addr_N") with the AP address to be collated ("Addr_M") to determine whether the AP addresses coincide.

As a result of the collation, if the AP addresses coincide (S4 "Y"), the information processing apparatus 10 moves to the process of S5 and sets "1" in the coincidence determination flag that is set in the AP address to be processed, for example (S5). On the other hand, if the AP addresses do not coincide as a result of the collation (S4, "N"), the information processing apparatus 10 skips the process of S5 and repeats the process by handling another AP address stored in the exchange request determination DB 210 as the collation target, for example. The information processing apparatus 10 repeats the processes of S4 and S5 for all AP addresses received in the process of S2 and collates the AP addresses with all AP addresses stored in the exchange request determination DB 210, for example.

In the example of FIGS. 7B(1) and 7B(2), the information processing apparatus 10 determines the coincidence of the AP address 05:07:09:0A:AC:BD received in the process of S2 with the AP address 05:07:09:0A:AC:BD stored in the exchange request determination DB 210. The coincidence determination flag set to "1" is set for the AP address 05:07:09:0A:AC:BD received in the process of S2.

In the process of S6 illustrated in FIG. 7A, the information processing apparatus 10 determines whether there is a coincidence determination flag set to "1", for example. If there is a coincidence determination flag set to "1" (S6 "Y"), the information processing apparatus 10 drives the exchange request based on the AP address in which the coincidence determination flag is set to "1", for example (S7).

The information processing apparatus 10 adds the AP address in which the coincidence determination flag set to "1" is set and notifies the A-CPU 11 that is the first processor of the exchange request of the exchange request determination DB 210 and the place determination DB 211, for example. The A-CPU 11 that is the first processor of the information processing apparatus 10 generates the exchange data of the areas Z1 and Z2 illustrated in FIG. 6D or the like based on, for example, the notified AP address. The A-CPU 11 that is the first processor of the information processing apparatus 10 transmits the generated exchange data of the areas Z1 and Z2 illustrated in FIG. 6D to the power-saving microcomputer 12 that is the second processor, for example. The power-saving microcomputer 12 that is the second processor of the information processing apparatus 10 receives the exchange data and rewrites the data of the exchange request determination DB 210 and the place determination DB 211 based on the received exchange data (S8).

The A-CPU 11 that is the first processor of the information processing apparatus 10 shifts to the sleep state as a result of reception response from the power-saving microcomputer 12 that is the second processor, regarding the reception of the exchange data, for example.

In the information processing apparatus 10, the data of the place determination DB 211 is rewritten based on the exchange data of the area Z1 illustrated in FIG. 6D, and the data of the exchange request determination DB 210 is rewritten based on the exchange data of the area Z2 illustrated in FIG. 6D, for example.

The information processing apparatus 10 drives the place determination process as a result of, for example, the completion of the rewriting of the data of each DB (S10). In the information processing apparatus 10, the exchange request determination process of S1 to S10 is executed based on the determination data stored in the exchange request determination BD 210 after the rewriting. In the information processing apparatus 10, the place determination process of the location of the information processing apparatus 10 is executed based on the place determination information stored in the place determination DB 211 after the rewriting.

On the other hand, in the process of S6 illustrated in FIG. 7A, if there is no coincidence determination flag set to "1" (S6, "N"), the information processing apparatus 10 determines whether the storage area of the place determination DB 211 is in the free state, for example (S9).

If the storage area of the place determination DB 211 is not in the free state (S9, "N"), the information processing apparatus 10 moves to the process of S10 and drives the place determination process, for example. The information processing apparatus 10 moves to the process of S2 after the drive of the place determination process and continues the exchange request determination process, for example. In the information processing apparatus 10 in which the place determination process is driven, the place determination process for the location is executed based on the scan data generated in the process of S1, for example.

If the storage area of the place determination DB 211 is in the free state (S9, "Y"), the information processing apparatus 10 moves to the process of S2 and continues the exchange request determination process, for example. In the information processing apparatus 10, the exchange request determination process is continuously executed until the AP address stored in the exchange request determination DB 210 is detected.

[Processing Sequence]

Figure 8A:
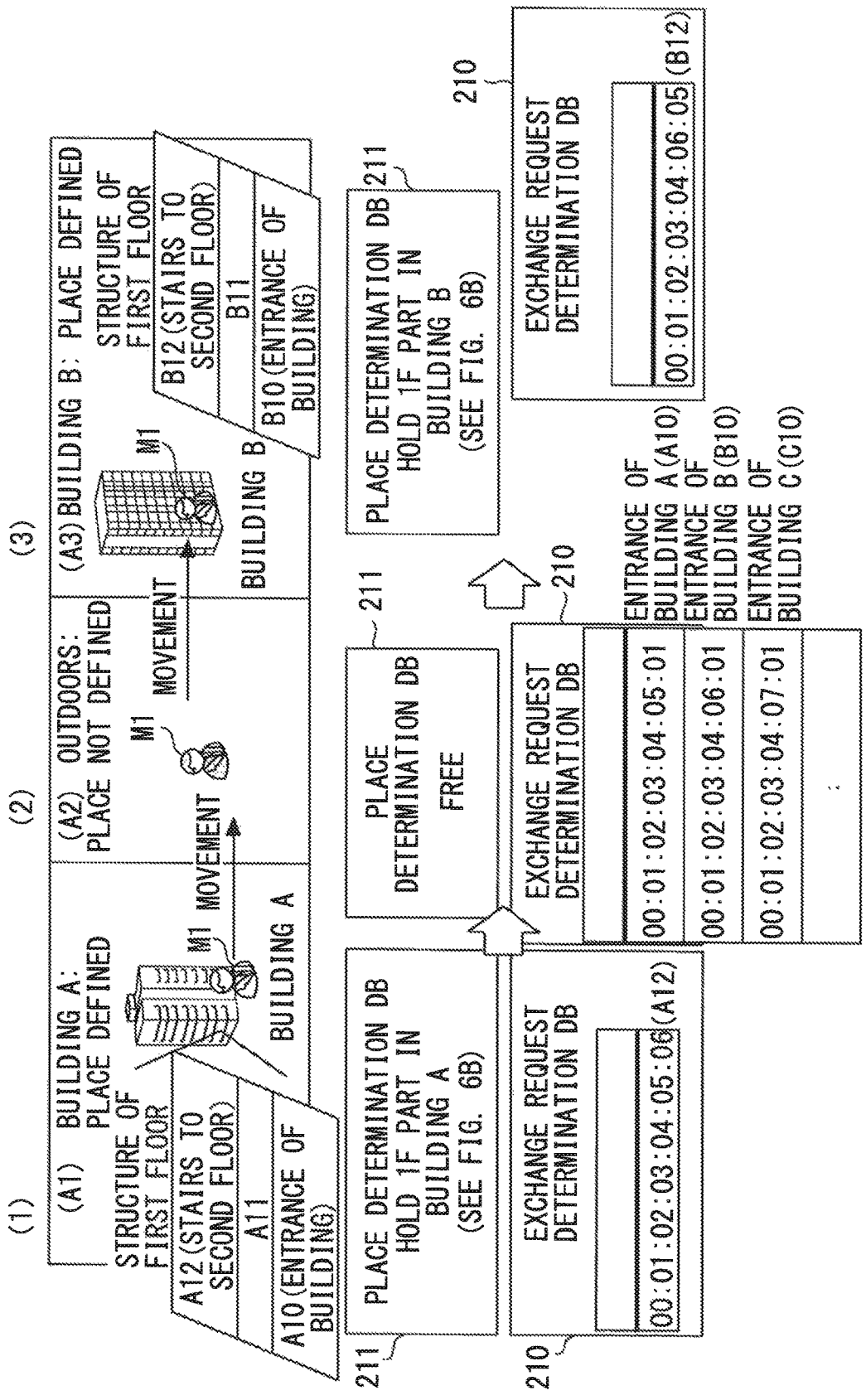
FIG. 8A is an explanatory view explaining transition of data of each DB along with movement of the information processing apparatus.

Next, a processing sequence between the A-CPU 11 that is the first processor and the power-saving microcomputer 12 that is the second processor in the information processing apparatus 10 will be described with reference to the drawings illustrated in FIG. 8A to FIG. 8E. FIG. 8A is an explanatory view explaining transition of the data held in the exchange request determination DB 210 and the place determination DB 211 of the power-saving microcomputer 12 that is the second processor along with the movement of the information processing apparatus 10 of the present embodiment.

FIG. 8A(1) is an explanatory view indicating a state of the data of each DB held in the area A1 illustrated in FIG. 3A, for example. In the area A1, the place definition around the building A is registered in the place determination master DB 110 of the A-CPU 11 that is the first processor, for example. FIG. 8A(2) is an explanatory view indicating a state of the data of each DB held in the area A2 illustrated in FIG. 3A for example, and the place definition information of the area A2 is not registered in the place determination master DB 110 of the A-CPU 111 that is the first processor for example. FIG. 8A(3) is an explanatory view indicating a state of the data of each DB held in the area A3 illustrated in FIG. 3A. In the area A3, the place definition around the building B is registered in the place determination master DB 110 of the A-CPU 11 that is the first processor, for example.

It is assumed that the information processing apparatus 10 of the present embodiment moves along with the user M1 from the area A1 in which the place definition around the building A is registered→the area A2 in which the place definition is not registered→the area A3 in which the place definition around the building B is registered. In the following description, the information defining the "place" will also be called "place definition information" and "place determination information".

In the example of FIG. 8A(1), the user M1 of the information processing apparatus 10 of the present embodiment has moved from a place "A12" that is stairs to the second floor of the building A to a place "A10" that is the entrance of the building A, through a place "A11". In the information processing apparatus 10, the beacon signal transmitted by each AP is scanned along with the movement of the user M1, and the exchange determination request process illustrated in FIG. 7A is executed. As a result of the exchange determination request process, the data illustrated in FIG. 8A(1) is held in the exchange request determination DB 210 and the place determination DB 211 of the information processing apparatus 10 that has moved to the outside of the building A from the entrance of the building A.

The data of the exchange request determination DB 210 and the place determination DB 211 illustrated in FIG. 8A(1) is, for example, data exchanged based on the scan result in the building A near the entrance of the building A just before the movement to the outside of the building A. For example, the place determination information including the places "A10" and "A11" corresponding to the first floor part in the building A is stored in the place determination DB 211. For example, the AP address 00:01:02:03:05:06 of the place "A12", which is the stairs to the second floor, that is the peripheral area of the first floor part in the building A is stored in the exchange request determination DB 210.

In the information processing apparatus 10 that has moved to the outside of the building A from the entrance of the building A, the place determination process and the exchange request determination process are executed based on, for example, the data illustrated in FIG. 8A(1) held in the exchange request determination DB 210 and the place determination DB 211.

Figure 8B:
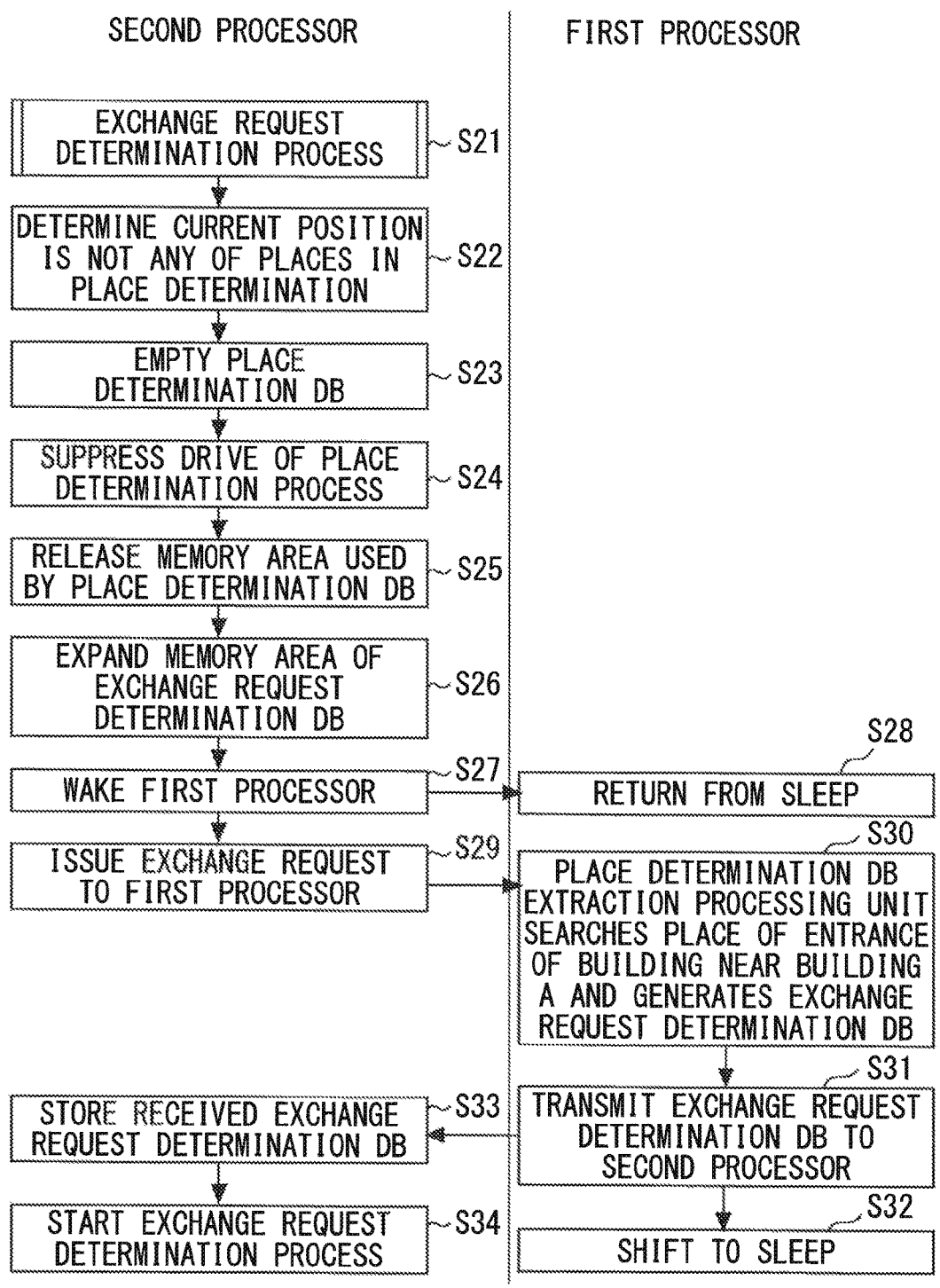
FIG. 8B is a diagram illustrating a processing sequence regarding an exchange process of the data of each DB between a first processor and a second processor.

FIG. 8B illustrates a processing sequence diagram regarding the exchange process of the data of the exchange request determination DB 210 and the place determination DB 211 between the first processor and the second processor. In the processing sequence diagram illustrated in FIG. 8B, the exchange request determination process illustrated in FIG. 7A is executed in the first processor of the information processing apparatus 10 based on, for example, the determination data of the exchange request determination DB 210 illustrated in FIG. 8A(1) (S21).

The information processing apparatus 10 that has moved to the outside of the building A from the entrance of the building A executes the exchange request determination process illustrated in FIG. 7A based on the AP address detected at the location. If the AP address 00:01:02:03:05:06 of the place "A12" held in the exchange request determination DB 210 illustrated in FIG. 8A(1) is not detected in the exchange request determination process illustrated in FIG. 7A, whether the storage area of the place determination DB 211 is in the free state is determined, for example.

In the information processing apparatus 10 that has moved to the outside of the building A from the entrance of the building A, the place determination information including the places "A10" and "A11" corresponding to the first floor part in the building A is held in the place determination DB 211 through the exchange request determination process executed most recently, for example. Therefore, the exchange process of S7 and S8 illustrated in FIG. 7A is skipped in the information processing apparatus 10, and the place determination process of S10 is driven, for example.

In the information processing apparatus 10 in which the place determination process is driven, the place determination process is executed by collating the scan data generated at the location after the movement to the outside of the building A from the entrance of the building A, with the place determination information held in the place determination DB 211, for example. However, the scan data generated outside of the building A does not include the AP address or the RSSI to be collated with the places "A10" and "A11" corresponding to the first floor part in the building A, for example. Therefore, the information processing apparatus 10 determines that the position is not at any of the places defined in the place determination DB 211 as a result of the place determination process based on the collation with the place determination information held in the place determination DB 211, for example (S22).

In the information processing apparatus 10 that has determined that the location is not any of the places defined in the place determination DB 211, the second processor deletes the data registered in the place determination DB 211, for example (S23). As a result of the deletion of the data, the place determination information including the places "A10" and "A11" corresponding to the first floor part in the building A illustrated in FIG. 8A(1) is deleted, for example.

The second processor of the information processing apparatus 10 that has deleted the data registered in the place determination DB 211 suppresses the drive of the place determination process, for example (S24). The second processor that has suppressed the drive of the place determination process releases the memory area used in the place determination DB 211, for example (S25). The second processor uses the released memory area as the memory area of the exchange request determination DB 210 to expand the memory area of the exchange request determination DB 210, for example (S26).

The second processor of the information processing apparatus 10 that has expanded the memory area of the exchange request determination DB 210 issues a start request to the first processor, for example (S27). The first processor of the information processing apparatus 10 receives the start request from the second processor, and the first processor is restored from the sleep state, for example (S28). The second processor of the information processing apparatus 10 issues an exchange request of the database to the first processor restored from the sleep state, for example (S29). The additional information, such as the identification information of AP and the base station ID, is not added to the exchange request of S29, for example. The second processor of the information processing apparatus 10 issues the exchange request of the database to the first processor without adding the additional information, for example.

The first processor that has received the exchange request of the database from the second processor generates exchange data in response to the exchange request not including the additional information, for example (S30). The first processor of the information processing apparatus 10 refers to the exchange data most recently stored in the storage unit 13*b* and specifies the "place" information for searching the place determination master DB 210, for example. In the storage unit 13*b*, the exchange data of the exchange request determination DB 210 and the place determination DB 211 at the time of the exchange process executed in the building A near the entrance of the building A illustrated in FIG. 8A(1) is stored, for example.

The first processor of the information processing apparatus 10 specifies the places "A10", "A11", and the like near the entrance in the building A from the exchange data of the place determination DB 211 stored in the storage unit 13*b*, for example. The first processor of the information processing apparatus 10 also specifies the AP address 00:01:02:03:05:06 of the place "A12" that is the peripheral area of the first floor part in the building A from the exchange data of the exchange request determination DB 210 stored in the storage unit 13*b*, for example.

The first processor of the information processing apparatus 10 searches the place determination master DB 110 based on the specified places "A10", "A11", "A12", and the like, for example. The first processor handles the specified places "A10", "A11", "A12", and the like as the center area and extracts the place determination information that is the peripheral area of the center area from the place determination master DB 110, for example. The first processor further extracts the AP address that is the partial information from the place determination information extracted from the place determination master DB 110 and generates exchange data of the exchange request determination DB 210, for example. The exchange data of the exchange request determination DB 210 is generated according to the capacity of the expanded memory area.

The first processor of the information processing apparatus 10 transmits the generated exchange data of the exchange request determination DB 210 to the second processor, for example (S31). The first processor shifts the first processor to the sleep state that is a low-power-consumption state, for example (S32).

The second processor of the information processing apparatus 10 rewrites the data of the exchange request determination DB 210 in which the memory area is expanded, based on the exchange data received from the first processor, for example (S33). In the second processor in which the rewriting of the data of the exchange request determination DB 210 is completed, the exchange request determination process is started based on the rewritten data of the exchange request determination DB 210, for example (S34).

As a result of the processing sequence illustrated in FIG. 8B, the state of the exchange request determination DB 210 and the place determination DB 211 of the information processing apparatus 10 after the exchange process is a state illustrated in FIG. 8A(2), for example. For example, the registered data is deleted, and the place determination DB 211 enters the free state. The memory area used for the data registered in the place determination DB 211 is released, and the released memory area of the place determination DB 211 is used to expand the memory area of the exchange request determination DB 210. AP addresses that are the partial information of the place determination information defined in the places of the peripheral area of the area A1 illustrated in FIG. 8A(1) are registered in the exchange request determination DB 210 in which the memory area is expanded, for example.

In the example of FIG. 8A(2), the exchange request determination DB 210 includes an AP address 00:01:02:03:05:01 of the place "A10" that is the entrance of the building A, an AP address 00:01:02:03:06:01 of a place "B10" that is the entrance of the building B, and the like. An AP address 00:01:02:03:07:01 of a place "C10" that is the entrance of the building C and the like are also included.

In the information processing apparatus 10 of the user M1 in FIG. 8A(2) who has moved to the area A2 in which the place definition information is not registered, the exchange request determination process is executed based on the AP addresses stored in the exchange request determination DB 210 illustrated in FIG. 8A(2), for example. Since the place definition information is not registered in the information processing apparatus 10 positioned in the area A2, there is no AP address stored in the exchange request determination DB 210 coinciding with the AP addresses detected by the scan.

In the information processing apparatus 10 positioned in the area A2, the place determination DB 211 is in the free state. Therefore, the exchange request for each DB is not generated in the information processing apparatus 10 moving in the area A2, and the exchange request determination process illustrated in FIG. 7A is repeated, for example. The information processing apparatus 10 repeats the exchange request determination process until the detection of the AP address of the place "A10" that is the entrance of the building A, the place "B10" that is the entrance of the building B, the place "C10" that is the entrance of the building C, or the like stored in the exchange request determination DB 210 of FIG. 8A(2), for example.

Next, the exchange process of the data of the exchange request determination DB 210 and the place determination DB 211 after the movement from the area A2 of FIG. 8A(2), in which the place definition information is not registered, to the area A3 of FIG. 8A(3), in which the place definition information around the building B is registered, will be described.

Figure 8C:
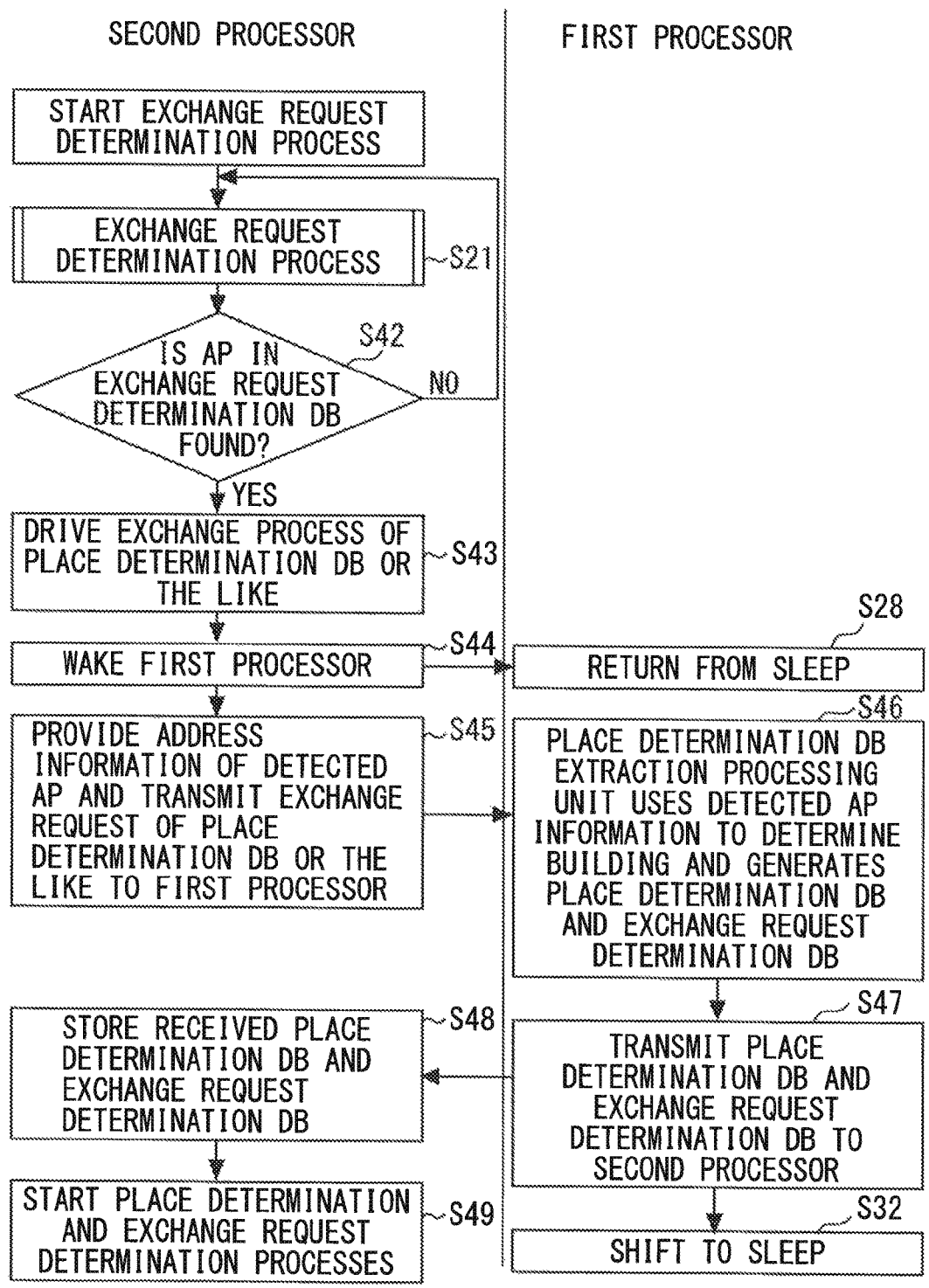
FIG. 8C is a diagram illustrating a processing sequence regarding the exchange process of the data of each DB between the first processor and the second processor.

FIG. 8C illustrates a processing sequence diagram regarding the exchange process of the data of the exchange request determination DB 210 and the place determination DB 211 between the first processor and the second processor in the area A3. In the processing sequence diagram illustrated in FIG. 8B, the second processor of the information processing apparatus 10 starts the exchange request determination process illustrated in FIG. 7A as a result of the execution of the scan at the location of the area A3, for example. The second processor of the information processing apparatus 10 executes the exchange request determination process based on, for example, the AP address detected by the scan and the AP address stored in the exchange request determination DB 210 illustrated in FIG. 8A(2) (S21).

The second processor of the information processing apparatus 10 collates the AP address detected by the scan with the AP address stored in the exchange request determination DB 210 to determine the coincidence of the AP addresses, for example (S42). If the AP addresses do not coincide (S42, "No"), the second processor repeats the exchange request determination process until the detection of the AP address coinciding with the AP address stored in the exchange request determination DB 210, for example.

On the other hand, if the AP addresses coincide (S42, "Yes"), the second processor of the information processing apparatus 10 drives the exchange process of the exchange request determination DB 210 and the place determination DB 211, for example (S43). The process of S42 of FIG. 8C is equivalent to, for example, the process of S6 of FIG. 7A, and the process of S43 of FIG. 8C is equivalent to, for example, the process of S7 of FIG. 7A.

For example, the AP address 00:01:02:03:06:01 of the place "B10" that is the entrance of the building B is detected in the information processing apparatus 10 that has moved from the area A2 of FIG. 8A(2) to the area A3 of FIG. 8A(3). The detected AP address 00:01:02:03:06:01 of the place "B10" that is the entrance of the building B is stored in the exchange request determination DB 210, for example. Therefore, the exchange process of the exchange request determination DB 210 and the place determination DB 211 is driven in the second processor of the information processing apparatus 10 that has detected the AP address 00:01:02:03:06:01.

Returning to the processing sequence diagram illustrated in FIG. 8C, the second processor of the information processing apparatus 10 issues a start request to the first processor, for example (S44). The first processor of the information processing apparatus 10 receives the start request from the second processor and restores the first processor from the sleep state, for example (S28). The second processor of the information processing apparatus 10 issues an exchange request of the exchange request determination DB 210 and the place determination DB 211 to the first processor returned from the sleep state, for example (S45).

The AP address coinciding with the AP address stored in the exchange request determination DB 210 is added as additional information to the exchange request of S45, for example. For example, the detected AP address 00:01:02:03:06:01 is added as additional information to the exchange request in the information processing apparatus 10 that has moved from the area A2 of FIG. 8A(2) to the area A3 of FIG. 8A(3).

The first processor that has received the exchange request, in which the AP address is added as additional information, from the second processor generates exchange data of the exchange request determination DB 210 and the place determination DB 211 based on the added AP address, for example (S46). The generation of the exchange data by the first processor is executed by, for example, the place determination DB extraction processing unit 102 illustrated in FIG. 5. The generation of the exchange data by the first processor is described in FIG. 6D and the like.

For example, the first processor of the information processing apparatus 10 searches the place determination master DB 110 based on the added AP address and specifies the place corresponding to the AP address. For example, in the information processing apparatus 10 that has moved from the area A2 of FIG. 8A(2) to the area A3 of FIG. 8A(3), the place "B10" that is the entrance of the building B is specified based on the AP address 00:01:02:03:06:01.

The first processor extracts the place determination information of the area Z1 including the place corresponding to the AP address from the place determination master DB 110 as illustrated in FIG. 6D, for example. The first processor generates exchange data of the place determination DB 211 from the extracted place determination information of the area Z1, for example.

The first processor of the information processing apparatus 10 handles the area Z1 as the center area and extracts, from the place determination master DB 110, the AP address of the place determination information of the area Z2 that is the peripheral area surrounding the area Z1 as illustrated in FIG. 6D, for example. The first processor generates exchange data of the exchange request determination DB 210 from the extracted AP address of the area Z2, for example. The exchange data of the exchange request determination DB 210 and the place determination DB 211 is extracted from the place determination master DB 110 according to, for example, the storage capacities allocated to the databases.

The first processor of the information processing apparatus 10 transmits the generated exchange data of the exchange request determination DB 210 and the place determination DB 211 to the second processor, for example (S47). The first processor shifts the first processor to the sleep state that is a low-power-consumption state, for example (S32).

The second processor of the information processing apparatus 10 rewrites the data of the exchange request determination DB 210 and the place determination DB 211 based on, for example, the exchange data received from the first processor (S48). The second processor in which the rewriting of the data is completed starts the place determination process and the exchange request determination process based on, for example, the rewritten data of the exchange request determination DB 210 and the place determination DB 211 (S49).

As a result of the processing sequence illustrated in FIG. 8C, the state of the exchange request determination DB 210 and the place determination DB 211 of the information processing apparatus 10 after the exchange process is, for example, the state illustrated in FIG. 8A(3). For example, the place determination information of the area range of the first floor part in the building B is registered in the memory area in the free state in the place determination DB 211. The area range of the first floor part in the building B includes the place determination information, such as the place "B10" that is the entrance of the building B and the place "B11" in the first floor of the building B1. The AP address 00:01:02:03:06:05 of the place "B12", which is the stairs to the second floor, that is the peripheral area of the first floor part in the building B is registered in the exchange request determination DB 210, for example.

In the information processing apparatus 10 that has moved from the area A2 of FIG. 8A(2) to the area A3 of FIG. 8A(3), the place determination process and the exchange request determination process are executed based on the data stored in the exchange request determination DB 210 and the place determination DB 211 illustrated in FIG. 8A(3).

Here, the processes of S45 to S49 executed by the information processing apparatus 10 are an example of a step of specifying a place by place specifying data of a partial area stored in the second storage unit based on a signal received by a reception unit and a step of updating the place specifying data of the partial area stored in the second storage unit and identification information of an access point stored in the third storage unit through the first processor when the identification information of the access point detected from the signal received by the reception unit is stored in the third storage unit. The power-saving microcomputer 12 and the A-CPU 11 of the information processing apparatus 10 execute the processes of S45 to S49 as an example of the step of specifying a place by place specifying data of a partial area stored in the second storage unit based on a signal received by a reception unit and a process of updating the place specifying data of the partial area stored in the second storage unit and identification information of an access point stored in the third storage unit through the first processor when the identification information of the access point detected from the signal received by the reception unit is stored in the third storage unit.

The processes of S22 to S26 and S29 executed by the information processing apparatus 10 are an example of a step in which when the place is not specified by the place specifying data of the partial area stored in the second storage unit, the second processor deletes the place specifying data of the partial area stored in the second storage unit to release a storage area of the second storage unit to suppress the process of specifying the place and extends the storage area of the third storage unit to include the released storage area of the second storage unit to store the identification information of the access point in the extended third storage unit through the first processor. The power-saving microcomputer 12 and the A-CPU 11 of the information processing apparatus 10 execute the processes of S22 to S26 and S29 as an example of a process in which when the place is not specified by the place specifying data of the partial area stored in the second storage unit, the second processor deletes the place specifying data of the partial area stored in the second storage unit to release a storage area of the second storage unit to suppress the process of specifying the place and extends the storage area of the third storage unit to include the released storage area of the second storage unit to store the identification information of the access point in the extended third storage unit through the first processor.

The processes of S27 and S32 executed by the information processing apparatus 10 are an example of a step in which the first processor restores a power consumption state from a power saving state in response to a request of the second processor and shifts the power consumption state to the power saving state as a result of extraction of the place specifying data of the partial area stored in the second storage unit or extraction of the identification information of the access point stored in the third storage unit from the place specifying data of the first storage unit. The power-saving microcomputer 12 and the A-CPU 11 of the information processing apparatus 10 execute the processes of S27 and S32 as an example of a process in which the first processor restores a power consumption state from a power saving state in response to a request of the second processor and shifts the power consumption state to the power saving state as a result of extraction of the place specifying data of the partial area stored in the second storage unit or extraction of the identification information of the access point stored in the third storage unit from the place specifying data of the first storage unit.

As described so far, in the information processing apparatus 10 of the present embodiment, the second processor includes the exchange request determination DB 210 in addition to the place determination DB 211 storing the place definition information (place determination information) for estimating the location of the information processing apparatus. The identification information of AP (for example, AP addresses) for determining the exchange request of the data held in each of the place determination DB 211 and the exchange request determination DB 210 is stored in the exchange request determination DB 210, for example. The place definition information of the partial area extracted from the place determination master DB 110 included in the first processor is stored in the place determination DB 211. The identification information of AP for determining the exchange request of the exchange request determination DB 210 is generated from, for example, the place definition information of the adjacent peripheral area surrounding the place definition information of the partial area stored in the place determination DB 211.

Therefore, the information processing apparatus 10 of the present embodiment can collate the identification information of AP detected at the location with the identification information of AP of the exchange request determination DB 210 to determine whether the location is the peripheral area of the place definition information stored in the place determination DB 211. As a result of the collation, if the detected identification information of AP coincides with the identification information of AP of the exchange request determination DB 210, the second processor of the information processing apparatus 10 of the present embodiment can execute the exchange process of the data of the place determination DB 211 storing the place definition information, for example.

The second processor of the information processing apparatus 10 of the present embodiment notifies the first processor of the exchange request provided with the coincided identification information of AP, for example. The first processor searches the place determination master DB 110 based on the notified identification information of AP and extracts the partial area in which the place definition information includes the notified identification information of AP to generate the exchange data of the place determination DB 211, for example. The first processor extracts, from the place determination master DB 110, the identification information of AP of the place definition information of the adjacent peripheral area surrounding the place definition information of the partial area of the exchange data of the place determination DB 211 to generate the exchange data of the exchange request determination DB 210, for example. The generated exchange data of the exchange request determination DB 210 and the place determination DB 211 is transmitted to the second processor.

The second processor of the information processing apparatus 10 of the present embodiment rewrites the data of the exchange request determination DB 210 and the place determination DB 211 based on, for example, the exchange data transmitted from the first processor. As a result of the rewriting of the data based on the exchange data, the data of the exchange request determination DB 210 and the place determination DB 211 of the second processor is updated.

In the information processing apparatus 10 of the present embodiment, the data stored in the place determination DB 211 and the exchange request determination DB 210 can be updated every time the identification information of AP stored in the exchange request determination DB 210 is detected. As a result, the information processing apparatus 10 of the present embodiment can continuously perform the place detection of the location based on the updated data even if there is a movement in a wide range area, for example. In the information processing apparatus 10 of the present embodiment, the place detection of a wide range area can be performed while maintaining the detection accuracy, even if the storage capacity of the second processor storing the data of the exchange request determination DB 210 and the place determination DB 211 is limited.

In the information processing apparatus 10 of the present embodiment, the second processor can determine that the location is not any of the places of the peripheral area of the exchange request determination DB 210 and the partial area of the place determination DB 211, for example. The second processor can release the storage area of the place determination DB 211 to expand the storage area of the exchange request determination DB 210 as a result of, for example, the determination that the location is not any of the places of the peripheral area of the exchange request determination DB 210 and the partial area of the place determination DB 211. The identification information of AP in an area of a wider range can be stored in the exchange request determination DB 210 in which the storage area is expanded. The information processing apparatus 10 of the present embodiment can hold the identification information of AP corresponding to an area of a wider range regarding the data exchange of the place determination DB 211 and the like, if the location is not any of the places of the peripheral area of the exchange request determination DB 210 and the partial area of the place determination DB 211, for example.

The first processor of the information processing apparatus 10 of the present embodiment returns from the sleep state that is a low-power-consumption state to perform the processing operation as a result of, for example, the detection of the identification information of AP coinciding with the identification information of AP stored in the exchange request determination DB 210. The first processor shifts to the sleep state that is a low-power-consumption state as a result of, for example, the transmission of the exchange data. Therefore, the first processor can maintain the low-power-consumption state in a period in which the second processor performs the place detection of the location based on the data stored in the exchange request determination DB 210 and the place determination DB 211, for example. The information processing apparatus 10 of the present embodiment can reduce the power consumption regarding the process of the place detection.

The second processor of the information processing apparatus 10 of the present embodiment can suppress the place determination process if the location is not any of the places of the peripheral area of the exchange request determination DB 210 and the partial area of the place determination DB 211, for example. Therefore, the power consumption regarding the place determination process by the second processor can be reduced during the movement in an area in which the place definition information is not registered, for example. The information processing apparatus 10 of the present embodiment can further reduce the power consumption regarding the process of the place detection in an area in which the place definition information is not registered, for example.

(Exchange Process Using Base Station ID)

In the area A2 of FIG. 8A(2), the information processing apparatus 10 executes the exchange request determination process of the data held in each DB based on, for example, the AP addresses registered in the exchange request determination DB 210 of FIG. 8A(2). When there is a movement from the area A2 in which the place definition is not registered to the area A3 in which the place definition around the building B is registered, the exchange request for the data registered in the exchange request determination DB 210 is not generated in the period at least before the detection of the AP address around the building B.

As illustrated in FIG. 5, in the information processing apparatus 10 including the base station change determination unit 205, a change in the base station ID of the active cell that receives the paging channel for receiving a call at the location is detected, and the exchange request of the exchange request determination DB 210 can be issued, for example.

Figure 8D:
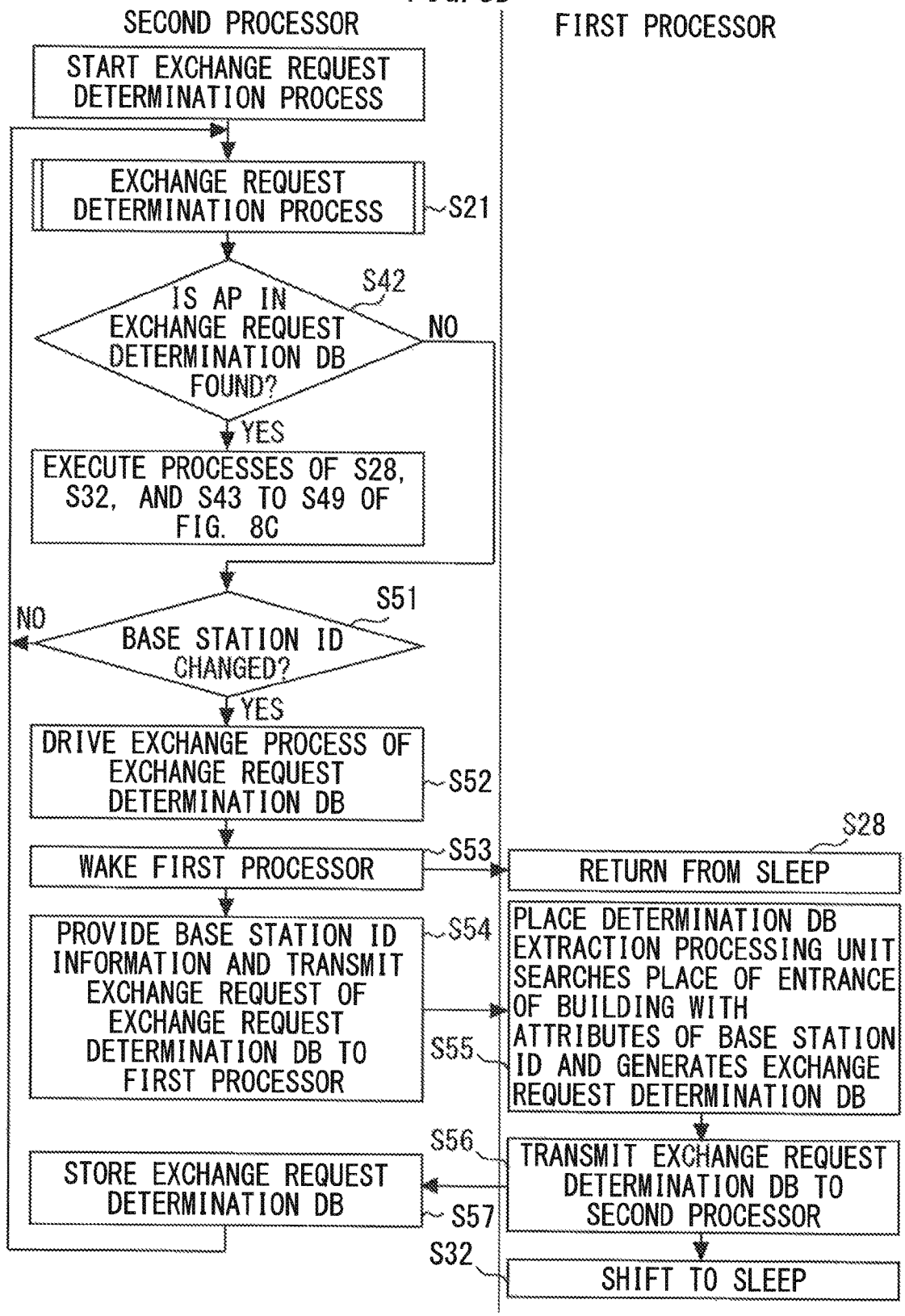
FIG. 8D is a diagram illustrating a processing sequence regarding the exchange process of the data of each DB between the first processor and the second processor after a change in a base station ID.

FIG. 8D illustrates a processing sequence diagram regarding the exchange process of the data of the exchange request determination DB 210 between the first processor and the second processor based on the change in the base station ID. In the processing sequence diagram illustrated in FIG. 8D, the same processes as the processes provided with the same numbers in the processing sequence diagram of FIG. 8C are executed in the processes of S21 and S42 after the start of the exchange request determination process. In the process of S42, if the AP address detected by the scan coincides with the AP address stored in the exchange request determination DB 210 (S42, "Yes"), the processes of S28, S32, and S43 to S49 of the processing sequence diagram of FIG. 8C are executed.

In the processing sequence diagram illustrated in FIG. 8D, the second processor of the information processing apparatus 10 moves to the process of S51 if the AP address detected by the scan does not coincide with the AP address stored in the exchange request determination DB 210, for example (S42, "No").

In the process of S51, for example, the second processor of the information processing apparatus 10 controls the mobile communication device 16b, searches the cell based on the notification information from the communication base station connected to the mobile phone network or the like, and acquires the base station ID of the communication base station, for example. The base station ID acquired in the process of S51 is, for example, the base station ID of the active cell that receives the paging channel for receiving a call.

The second processor of the information processing apparatus 10 compares the acquired base station ID with the base station ID acquired at the location of the destination just after the movement and determines the change in the base station ID, for example. If there is no change in the base station ID acquired after the movement (S51, "No"), the second processor repeats the processes of S21 and S42, for example. On the other hand, if there is a change in the base station ID acquired after the movement (S51, "Yes"), the second processor drives the exchange process of the exchange request determination DB 210, for example (S52). The process of S52 of FIG. 8D is equivalent to the process of S7 of FIG. 7A, for example.

The second processor of the information processing apparatus 10 in which the exchange process is driven issues a start request to the first processor, for example (S53). The first processor of the information processing apparatus 10 receives the start request from the second processor and restores the first processor from the sleep state, for example (S28).

The second processor of the information processing apparatus 10 issues an exchange request of the exchange request determination DB 210 to the first processor returned from the sleep state, for example (S54). Here, the second processor handles the base station ID information acquired after the movement as additional information and adds the additional information to the exchange request. The second processor transmits the exchange request including the additional information to the first processor. The notification information from the communication base station acquired in the cell search includes the base station ID and the like around the active cell. The second processor may include, in the base station ID information, the ID of a peripheral base station other than the base station ID of the active cell, for example.

The first processor that has received the exchange request provided with the base station ID information as the additional information from the second processor of the information processing apparatus 10 generates exchange data of the exchange request determination DB 210 based on the added base station ID information, for example (S55). The generation of the exchange data by the first processor is performed by, for example, the place determination DB extraction processing unit 102 illustrated in FIG. 5. The generation of the exchange data by the first processor is described in FIG. 6E and the like.

For example, the first processor of the information processing apparatus 10 searches the place determination master DB 110 based on the added base station ID information and specifies the place corresponding to the base station ID information. The first processor extracts, from the place determination master DB 110, the place determination information of the area Z3 in which the place corresponding to the attributes of the notified base station ID information is the center area, as illustrated in FIG. 6E, for example. The first processor further extracts the AP address from the extracted place determination information of the area Z3 to generate the exchange data of the exchange request determination DB 211, for example. The exchange data is generated according to the storage capacity of the exchange request determination DB 211 in which the memory area is expanded.

Returning to the processing sequence diagram illustrated in FIG. 8D, the first processor of the information processing apparatus 10 transmits the generated exchange data of the exchange request determination DB 210 to the second processor, for example (S56). The first processor shifts the first processor to the sleep state that is a low-power-consumption state, for example (S32).

The second processor of the information processing apparatus 10 rewrites the data of the exchange request determination DB 210 based on the exchange data received from the first processor, for example (S57). The second processor that has completed the rewriting of the data continues the exchange request determination process along the processing sequence diagram illustrated in FIG. 8D based on the rewritten data of the exchange request determination DB 210, for example.

Here, the processes of S42 "No", S51, and S54 to S56 executed by the information processing apparatus 10 are an example of a step by the second processor detecting a change in a base station ID of the communication base station based on the signal received by the second reception unit when the storage area of the third storage unit is extended and a step by the second processor updating the identification information of the access point of the third storage unit based on the base station ID after the detected change. The power-saving microcomputer 12 and the A-CPU 11 of the information processing apparatus 10 execute the processes of S42 "No", S51, and S54 to S56 as an example of a process by the second processor detecting a change in a base station ID of the communication base station based on the signal received by the second reception unit when the storage area of the third storage unit is extended and a process by the second processor updating the identification information of the access point of the third storage unit based on the base station ID after the detected change.

As described, in the information processing apparatus 10 including the base station change determination unit 205, the change in the base station ID can be detected to issue the exchange request of the data of the exchange request determination DB 210, for example. Therefore, the information processing apparatus 10 of the present embodiment can update the data of the exchange request determination DB 210 according to the communication possible range provided by the communication base station of the mobile phone network or the like, for example. As a result, the information processing apparatus 10 of the present embodiment can perform the place detection of an area in a wide range while maintaining the detection accuracy even when the information processing apparatus 10 moves in an area range across the installation positions of the communication base stations, for example.

(Exchange Process at Start of Place Detection)

FIG. 8E illustrates a processing sequence diagram regarding the exchange process of the data of the exchange request determination DB 210 between the first processor and the second processor at the start of the place detection process, such as at the power activation. At the start of the place detection process, the first processor in the information processing apparatus 10 performs the place determination based on the scan data and determines the data of the exchange request determination DB 210 and the place determination DB 211. As described in Comparative Example of FIG. 1A, the place detection process is, for example, a process including the scan control for detecting the beacon signal or the like and the place determination process for estimating the location.

In the processing sequence diagram illustrated in FIG. 8E, the second processor of the information processing apparatus 10 starts the place detection process at the location as a result of, for example, the power activation or the like of the information processing apparatus 10 (S71). The second processor of the information processing apparatus 10 scans the radio wave (such as beacon signal) transmitted by each AP through the process by the Wifi device control unit 201, for example (S72). As a result of the scan, the scan data illustrated in FIG. 6A(1) is generated in the second processor, for example.

The second processor of the information processing apparatus 10 notifies the first processor of the generated scan data and issues the exchange request of the data of the exchange request determination DB 210 and the place determination DB 211, for example (S73). The second processor may issue, to the first processor, the exchange request of the data of the exchange request determination DB 210 and the place determination DB 211 as a result of the power activation and notify the first processor of the scan data generated in the process of S72, for example.

The first processor of the information processing apparatus 10 executes the place determination process based on, for example, the scan data notified from the second processor (S74). The place determination process is executed by, for example, the place determination unit 103 of the first processor illustrated in FIG. 5. The first processor determines the place of the location by collating the notified scan data with the place definition information (place determination information) registered in the place determination master DB 110, for example.

In the first processor of the information processing apparatus 10, the place determined in the place determination process of S74 is used to generate initial data of the exchange request determination DB 210 and the place determination DB 211 (S75). For example, the first processor searches the place determination master DB 110 based on the place determined in the process of S74 and extracts the place determination information of the area Z1 including the determined place from the place determination master DB 110 as illustrated in FIG. 6D, for example. The first processor generates the initial data of the place determination DB 211 from, for example, the extracted place determination information of the area Z1.

The first processor of the information processing apparatus 10 handles the area Z1 as the center area and extracts, from the place determination master DB 110, the AP address of the place determination information of the area Z2 that is the peripheral area surrounding the area Z1 as illustrated in FIG. 6D, for example. The first processor generates the initial data of the exchange request determination DB 210 from the extracted AP address of the area Z2, for example. The initial data of the exchange request determination DB 210 and the place determination DB 211 is extracted from the place determination master DB 110 according to, for example, the storage capacities allocated to the databases.

The first processor of the information processing apparatus 10 transmits the generated initial data of the exchange request determination DB 210 and the place determination DB 211 to the second processor, for example (S76). The first processor shifts the first processor to the sleep state that is a low-power-consumption state, for example (S32).

The second processor of the information processing apparatus 10 stores the initial data received from the first processor in the exchange request determination DB 210 and the place determination DB 211, for example (S77). The second processor that has completed storing the initial data starts the place determination process and the exchange request determination process based on, for example, the initial data stored in the exchange request determination DB 210 and the place determination DB 211 (S78).

Here, the processes of S73 to S76 executed by the information processing apparatus 10 are an example of a place specifying step by the first processor specifying the place by the master data of the place specifying data stored in the first storage unit based on the signal received by the reception unit and a step by the first processor extracting the place specifying data of the partial area stored in the second storage unit and the identification information of the access point stored in the third storage unit based on the place specified in the place specifying step. The power-saving microcomputer 12 and the A-CPU 11 of the information processing apparatus 10 execute the processes of S73 to S76 as an example of a place specifying process by the first processor specifying the place by the master data of the place specifying data stored in the first storage unit based on the signal received by the reception unit and a process by the first processor extracting the place specifying data of the partial area stored in the second storage unit and the identification information of the access point stored in the third storage unit based on the place specified in the place specifying process.

As described, in the information processing apparatus 10, the first processor can specify the place based on the scan data generated at the location, at the start of the place detection process such as at the power activation, for example. The first processor of the information processing apparatus 10 can generate the initial data of the exchange request determination DB 210 and the place determination DB 211 based on the specified place. The second processor of the information processing apparatus 10 can hold the place definition information (place determination information) corresponding to the location and the AP addresses for exchanging the data of each DB, even at the start of the place detection process such as at the power activation, for example. The information processing apparatus 10 can execute the place determination process and the exchange request determination process by the second processor from just after the start of the place detection process at the power activation, for example.

The place detection process executed by the information processing apparatus 10 of the present embodiment can also be applied to the place detection using a wireless communication technique, such as Bluetooth (registered trademark) and ZigBee, in place of the wireless LAN, for example.

[Computer Readable Recording Medium]

A program that causes a computer, or the other machine or device (hereafter, referred to as a computer or the like) to implement any one of the above-described functions can be recorded in a non-transitory recording medium readable by the computer or the like. Then, the function can be provided by causing the computer or the like to read and execute the program in this recording medium.

Herein, the recording medium readable by the computer or the like means a recording medium capable of accumulating information such as data or programs through electrical, magnetic, optical, mechanical, or chemical actions, which can be read by the computer or the like. Among such recording media, those detachable from the computer or the like include, for example, a flexible disk, magneto-optical disk, CD-ROM, CD-R/W, DVD, Blu-ray Disk, DAT, 8 mm tape, and a memory card such as a flash memory. In addition, recording media fixed in the computer or the like include a hard disk and ROM (Read Only Memory).

[Effects of Embodiment]

According to the disclosed information processing apparatus, a technique of reducing power consumption to detect a place in a wide range can be provided.

What is claimed is:

1. An information processing apparatus comprising:
   a reception unit that receives a signal from an access point;
   a first storage unit that stores master data of place specifying data including identification information of the access point detected from the signal received by the reception unit in each place and including strength of the received signal;
   a first processor that accesses the first storage unit;
   a second storage unit that stores place specifying data of a partial area extracted by the first processor from the place specifying data in the first storage unit;
   a third storage unit that stores the identification information of the access point detected in a place around a first place specified by the place specifying data of the extracted partial area; and
   a second processor that accesses the second storage unit and the third storage unit, wherein
   the second processor executes:
   a process of specifying the first place by the place specifying data of the partial area stored in the second storage unit based on the signal received by the reception unit, and
   a process of updating, when the identification information of the access point detected from the signal received by the reception unit is stored in the third storage unit, the place specifying data of the partial area stored in the second storage unit and the identification information of the access point stored in the third storage unit by transferring the detected identification information of the access point to the first processor, wherein the first processor extracts information for updating the place specifying data of the partial area of the second storage unit and the identification information of the access point in the third storage unit from the place specifying data in the first storage unit based on the place of the access point specified by the transferred identification information, and when the first place is not specified by the place specifying data of the partial area stored in the second storage unit, the second processor executes a process of deleting the place specifying data of the partial area stored in the second storage unit to release a storage area of the second storage unit so as to suppress the process of specifying the first place, of extending a storage area of the third storage unit to include the released storage area of the second storage unit, and of storing the identification information of the access point in the extended third storage unit through the first processor.

2. The information processing apparatus according to claim 1, further comprising a second reception unit that receives a signal from a communication base station connected to a mobile phone network, wherein the place specifying data of the master data stored in the first storage unit includes base station ID information of the communication base station, and when the storage area of the third storage unit is extended, the second processor executes a process of detecting a change in a base station ID of the communication base station based on the signal received by the second reception unit, and a process of updating the identification information of the access point in the third storage unit based on the base station ID after the detected change.

3. The information processing apparatus according to claim 2, wherein the first processor executes a place specifying process of specifying the first place by the master data of the place specifying data stored in the first storage unit based on the signal received by the reception unit, and a process of extracting the place specifying data of the partial area stored in the second storage unit and the identification information of the access point stored in the third storage unit based on the place specified in the place specifying process.

4. The information processing apparatus according to claim 3, wherein the first processor executes a process of restoring a power consumption state from a power saving state in response to a request of the second processor, and of shifting the power consumption state to the power saving state as a result of extraction of the place specifying data of the partial area stored in the second storage unit or extraction of the identification information of the access point stored in the third storage unit from the place specifying data in the first storage unit.

5. A non-transitory computer readable recording medium recorded with a program that causes a second processor in a computer to execute processing comprising:

a process of specifying a first place by place specifying data of a partial area stored in a second storage unit accessed by the second processor based on a signal received by a reception unit, the reception unit receiving the signal from an access point, the second storage unit being accessed by the second processor and storing the place specifying data of the partial area extracted by a first processor from the place specifying data in a first storage unit, and the first storage unit being accessed by the first processor and storing master data of the place specifying data including identification information of the access point detected from the signal received by the reception unit in each place and including strength of the received signal; and a process of updating, when the identification information of the access point detected from the signal received by the reception unit is stored in a third storage unit accessed by the second processor that stores the identification information of the access point detected in a place around the first place specified by the place specifying data of the extracted partial area, the place specifying data of the partial area stored in the second storage unit and the identification information of the access point stored in the third storage unit by transferring the detected identification information of the access point to the first processor, wherein the first processor extracts information for updating the place specifying data of the partial area of the second storage unit and the identification information of the access point in the third storage unit from the place specifying data in the first storage unit based on the place of the access point specified by the transferred identification information, and when the first place is not specified by the place specifying data of the partial area stored in the second storage unit, the second processor executes a process of deleting the place specifying data of the partial area stored in the second storage unit to release a storage area of the second storage unit so as to suppress the process of specifying the first place, of extending a storage area of the third storage unit to include the released storage area of the second storage unit, and of storing the identification information of the access point in the extended third storage unit through the first processor.

6. An information processing method by which a second processor in a computer executes processing comprising:

a process of specifying a first place by place specifying data of a partial area stored in a second storage unit accessed by the second processor based on a signal received by a reception unit, the reception unit receiving the signal from an access point, the second storage unit being accessed by the second processor and storing the place specifying data of the partial area extracted by a first processor from the place specifying data in a first storage unit, and the first storage unit being accessed by the first processor and storing master data of the place specifying data including identification information of the access point detected from the signal received by the reception unit in each place and including strength of the received signal; and a process of updating, when the identification information of the access point detected from the signal received by the reception unit is stored in a third storage unit accessed by the second processor that stores the identification information of the access point detected in a place around the first place specified by the place specifying data of the extracted partial area, the place specifying data of the partial area stored in the second storage unit and the identification information of the access point stored in the third storage unit by transferring the detected identification information of the access point to the first processor, wherein the first processor extracts information for updating the place specifying data of the partial area of the second storage unit and the identification information of the access point in the third storage unit from the place specifying data in the first storage unit based on the place of the access point specified by the transferred identification information, and when the first place is not specified by the place specifying data of the partial area stored in the second storage unit, the second processor executes a process of deleting the place specifying data of the partial area stored in the second storage unit to release a storage area of the second storage unit so as to suppress the process of specifying the first place, of extending a storage area of the third storage unit to include the released storage area of the second storage unit, and of storing the identification information of the access point in the extended third storage unit through the first processor.

* * * * *